US012670876B2

(12) United States Patent (10) Patent No.: US 12,670,876 B2
Rannon et al. (45) Date of Patent: Jun. 30, 2026

(54) FAST RESPONSE COLOR WAVEFORMS FOR MULTIPARTICLE ELECTROPHORETIC DISPLAYS

(71) Applicant: E INK CORPORATION, Billerica, MA (US)

(72) Inventors: Meital Rannon, Arlington, MA (US); Ian Hunter, Waltham, MA (US); Sanket Diwale, Boston, MA (US); Amit Deliwala, Andover, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 18/978,612

(22) Filed: Dec. 12, 2024

(65) Prior Publication Data

US 2025/0201206 A1 Jun. 19, 2025

Related U.S. Application Data

(60) Provisional application No. 63/610,506, filed on Dec. 15, 2023.

(51) Int. Cl.
| | |
|---|---|
| *G09G 3/34* | (2006.01) |
| *G02F 1/167* | (2019.01) |
| *G02F 1/1685* | (2019.01) |
| *G02F 1/1675* | (2019.01) |

(52) U.S. Cl.
CPC ............. *G09G 3/344* (2013.01); *G02F 1/167* (2013.01); *G02F 1/1685* (2019.01); *G02F 2001/1678* (2013.01); *G09G 2310/068* (2013.01)

(58) Field of Classification Search
CPC ............. G09G 3/344; G09G 2310/068; G09G 2300/0452; G09G 3/2003; G09G 2310/0254; G09G 2320/0204; G02F 1/167; G02F 1/1685; G02F 2001/1678
See application file for complete search history.

(56) References Cited

U.S. PATENT DOCUMENTS

| | | |
|---|---|---|
| 4,418,346 A | 11/1983 | Batchelder |
| 5,872,552 A | 2/1999 | Gordon, II et al. |
| 5,930,026 A | 7/1999 | Jacobson et al. |
| 6,017,584 A | 1/2000 | Albert et al. |
| 6,130,774 A | 10/2000 | Albert et al. |
| 6,144,361 A | 11/2000 | Gordon, II |
| 6,172,798 B1 | 1/2001 | Albert et al. |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,271,823 B1 | 8/2001 | Gordon, II |
| 6,445,489 B1 | 9/2002 | Jacobson et al. |
| 6,504,524 B1 | 1/2003 | Gates et al. |
| 6,512,354 B2 | 1/2003 | Jacobson et al. |

(Continued)

OTHER PUBLICATIONS

European Patent Office, "International Search Report and Written Opinion", PCT/US2024/059802, Mar. 7, 2025.

*Primary Examiner* — Dmitriy Bolotin
(74) *Attorney, Agent, or Firm* — Brian D. Bean

(57) ABSTRACT

Fast response color waveforms for driving multi-particle color electrophoretic media to improve the user experience of a display, e.g. a tablet, monitor, or interactive sign, that incorporates multi-particle color electrophoretic media. In particular, the waveforms result in a sharp and immediate response, which is preferred when writing with a stylus, or typing on a keyboard, or interacting with an icon on a sign, such as a timetable.

19 Claims, 12 Drawing Sheets
(2 of 12 Drawing Sheet(s) Filed in Color)

(56)                References Cited

U.S. PATENT DOCUMENTS

| | | | |
|---|---|---|---|
| 6,531,997 B1 | 3/2003 | Gates et al. |
| 6,545,797 B2 | 4/2003 | Chen et al. |
| 6,664,944 B1 | 12/2003 | Albert et al. |
| 6,672,921 B1 | 1/2004 | Liang et al. |
| 6,753,999 B2 | 6/2004 | Zehner et al. |
| 6,788,449 B2 | 9/2004 | Liang et al. |
| 6,788,452 B2 | 9/2004 | Liang et al. |
| 6,825,970 B2 | 11/2004 | Goenaga et al. |
| 6,864,875 B2 | 3/2005 | Drzaic et al. |
| 6,866,760 B2 | 3/2005 | Paolini, Jr. et al. |
| 6,900,851 B2 | 5/2005 | Morrison et al. |
| 6,914,714 B2 | 7/2005 | Chen et al. |
| 6,922,276 B2 | 7/2005 | Zhang et al. |
| 6,972,893 B2 | 12/2005 | Chen et al. |
| 6,982,178 B2 | 1/2006 | LeCain et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,023,420 B2 | 4/2006 | Comiskey et al. |
| 7,034,783 B2 | 4/2006 | Gates et al. |
| 7,038,656 B2 | 5/2006 | Liang et al. |
| 7,038,670 B2 | 5/2006 | Liang et al. |
| 7,046,228 B2 | 5/2006 | Liang et al. |
| 7,052,571 B2 | 5/2006 | Wang et al. |
| 7,061,166 B2 | 6/2006 | Kuniyasu |
| 7,061,662 B2 | 6/2006 | Chung et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,144,942 B2 | 12/2006 | Zang et al. |
| 7,167,155 B1 | 1/2007 | Albert et al. |
| 7,170,670 B2 | 1/2007 | Webber |
| 7,176,880 B2 | 2/2007 | Amundson et al. |
| 7,177,066 B2 | 2/2007 | Chung et al. |
| 7,193,625 B2 | 3/2007 | Danner et al. |
| 7,202,847 B2 | 4/2007 | Gates |
| 7,242,514 B2 | 7/2007 | Chung et al. |
| 7,259,744 B2 | 8/2007 | Arango et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,327,511 B2 | 2/2008 | Whitesides et al. |
| 7,339,715 B2 | 3/2008 | Webber et al. |
| 7,385,751 B2 | 6/2008 | Chen et al. |
| 7,408,699 B2 | 8/2008 | Wang et al. |
| 7,411,719 B2 | 8/2008 | Paolini, Jr. et al. |
| 7,453,445 B2 | 11/2008 | Amundson |
| 7,492,339 B2 | 2/2009 | Amundson |
| 7,492,505 B2 | 2/2009 | Liang et al. |
| 7,528,822 B2 | 5/2009 | Amundson et al. |
| 7,535,624 B2 | 5/2009 | Amundson et al. |
| 7,545,358 B2 | 6/2009 | Gates et al. |
| 7,583,251 B2 | 9/2009 | Arango et al. |
| 7,602,374 B2 | 10/2009 | Zehner et al. |
| 7,612,760 B2 | 11/2009 | Kawai |
| 7,667,684 B2 | 2/2010 | Jacobson et al. |
| 7,679,599 B2 | 3/2010 | Kawai |
| 7,679,813 B2 | 3/2010 | Liang et al. |
| 7,679,814 B2 | 3/2010 | Paolini, Jr. et al. |
| 7,683,606 B2 | 3/2010 | Kang et al. |
| 7,684,108 B2 | 3/2010 | Wang et al. |
| 7,688,297 B2 | 3/2010 | Zehner et al. |
| 7,715,088 B2 | 5/2010 | Liang et al. |
| 7,729,039 B2 | 6/2010 | LeCain et al. |
| 7,733,311 B2 | 6/2010 | Amundson et al. |
| 7,733,335 B2 | 6/2010 | Zehner et al. |
| 7,787,169 B2 | 8/2010 | Abramson et al. |
| 7,791,789 B2 | 9/2010 | Albert et al. |
| 7,800,813 B2 | 9/2010 | Wu et al. |
| 7,821,702 B2 | 10/2010 | Liang et al. |
| 7,839,564 B2 | 11/2010 | Whitesides et al. |
| 7,859,742 B1 | 12/2010 | Chiu et al. |
| 7,910,175 B2 | 3/2011 | Webber |
| 7,952,557 B2 | 5/2011 | Amundson |
| 7,952,790 B2 | 5/2011 | Honeyman et al. |
| 7,956,841 B2 | 6/2011 | Albert et al. |
| 7,982,479 B2 | 7/2011 | Wang et al. |
| 7,982,941 B2 | 7/2011 | Lin et al. |
| 7,999,787 B2 | 8/2011 | Amundson et al. |
| 8,009,348 B2 | 8/2011 | Zehner et al. |
| 8,040,594 B2 | 10/2011 | Paolini, Jr. et al. |
| 8,054,526 B2 | 11/2011 | Bouchard |
| 8,077,141 B2 | 12/2011 | Duthaler et al. |
| 8,098,418 B2 | 1/2012 | Paolini, Jr. et al. |
| 8,125,501 B2 | 2/2012 | Amundson et al. |
| 8,139,050 B2 | 3/2012 | Jacobson et al. |
| 8,159,636 B2 | 4/2012 | Sun et al. |
| 8,174,490 B2 | 5/2012 | Whitesides et al. |
| 8,213,076 B2 | 7/2012 | Albert et al. |
| 8,243,013 B1 | 8/2012 | Sprague et al. |
| 8,274,472 B1 | 9/2012 | Wang et al. |
| 8,289,250 B2 | 10/2012 | Zehner et al. |
| 8,300,006 B2 | 10/2012 | Zhou et al. |
| 8,305,341 B2 | 11/2012 | Arango et al. |
| 8,314,784 B2 | 11/2012 | Ohkami et al. |
| 8,363,299 B2 | 1/2013 | Paolini, Jr. et al. |
| 8,373,649 B2 | 2/2013 | Low et al. |
| 8,384,658 B2 | 2/2013 | Albert et al. |
| 8,422,116 B2 | 4/2013 | Sprague et al. |
| 8,441,714 B2 | 5/2013 | Paolini, Jr. et al. |
| 8,441,716 B2 | 5/2013 | Paolini, Jr. et al. |
| 8,456,414 B2 | 6/2013 | Lin et al. |
| 8,462,102 B2 | 6/2013 | Wong et al. |
| 8,466,852 B2 | 6/2013 | Drzaic et al. |
| 8,503,063 B2 | 8/2013 | Sprague |
| 8,514,168 B2 | 8/2013 | Chung et al. |
| 8,537,105 B2 | 9/2013 | Chiu et al. |
| 8,558,783 B2 | 10/2013 | Wilcox et al. |
| 8,558,785 B2 | 10/2013 | Zehner et al. |
| 8,558,786 B2 | 10/2013 | Lin |
| 8,558,855 B2 | 10/2013 | Sprague et al. |
| 8,576,164 B2 | 11/2013 | Sprague et al. |
| 8,576,259 B2 | 11/2013 | Lin et al. |
| 8,576,470 B2 | 11/2013 | Paolini, Jr. et al. |
| 8,576,475 B2 | 11/2013 | Huang et al. |
| 8,593,396 B2 | 11/2013 | Amundson et al. |
| 8,593,721 B2 | 11/2013 | Albert et al. |
| 8,605,032 B2 | 12/2013 | Liu et al. |
| 8,605,354 B2 | 12/2013 | Zhang et al. |
| 8,643,595 B2 | 2/2014 | Chung et al. |
| 8,649,084 B2 | 2/2014 | Wang et al. |
| 8,665,206 B2 | 3/2014 | Lin et al. |
| 8,670,174 B2 | 3/2014 | Sprague et al. |
| 8,681,191 B2 | 3/2014 | Yang et al. |
| 8,704,756 B2 | 4/2014 | Lin |
| 8,717,664 B2 | 5/2014 | Wang et al. |
| 8,730,153 B2 | 5/2014 | Sprague et al. |
| 8,786,935 B2 | 7/2014 | Sprague |
| 8,797,634 B2 | 8/2014 | Paolini, Jr. et al. |
| 8,810,525 B2 | 8/2014 | Sprague |
| 8,810,899 B2 | 8/2014 | Sprague et al. |
| 8,830,559 B2 | 9/2014 | Honeyman et al. |
| 8,873,129 B2 | 10/2014 | Paolini, Jr. et al. |
| 8,902,153 B2 | 12/2014 | Bouchard et al. |
| 8,902,491 B2 | 12/2014 | Wang et al. |
| 8,917,439 B2 | 12/2014 | Wang et al. |
| 8,928,562 B2 | 1/2015 | Gates et al. |
| 8,928,641 B2 | 1/2015 | Chiu et al. |
| 8,964,282 B2 | 2/2015 | Wang et al. |
| 8,976,444 B2 | 3/2015 | Zhang et al. |
| 9,013,394 B2 | 4/2015 | Lin |
| 9,013,783 B2 | 4/2015 | Sprague |
| 9,019,197 B2 | 4/2015 | Lin |
| 9,019,198 B2 | 4/2015 | Lin et al. |
| 9,019,318 B2 | 4/2015 | Sprague et al. |
| 9,082,352 B2 | 7/2015 | Cheng et al. |
| 9,116,412 B2 | 8/2015 | Lin |
| 9,146,439 B2 | 9/2015 | Zhang |
| 9,164,207 B2 | 10/2015 | Honeyman et al. |
| 9,170,467 B2 | 10/2015 | Whitesides et al. |
| 9,170,468 B2 | 10/2015 | Lin et al. |
| 9,171,508 B2 | 10/2015 | Sprague et al. |

(56) References Cited

U.S. PATENT DOCUMENTS

| | | | |
|---|---|---|---|
| 9,182,646 B2 | 11/2015 | Paolini, Jr. et al. | |
| 9,195,111 B2 | 11/2015 | Anseth et al. | |
| 9,199,441 B2 | 12/2015 | Danner | |
| 9,218,773 B2 | 12/2015 | Sun et al. | |
| 9,224,338 B2 | 12/2015 | Chan et al. | |
| 9,224,342 B2 | 12/2015 | Lin et al. | |
| 9,224,344 B2 | 12/2015 | Chung et al. | |
| 9,230,492 B2 | 1/2016 | Harrington et al. | |
| 9,251,736 B2 | 2/2016 | Lin et al. | |
| 9,262,973 B2 | 2/2016 | Wu et al. | |
| 9,268,191 B2 | 2/2016 | Paolini, Jr. et al. | |
| 9,269,311 B2 | 2/2016 | Amundson | |
| 9,279,906 B2 | 3/2016 | Kang | |
| 9,285,649 B2 | 3/2016 | Du et al. | |
| 9,293,511 B2 | 3/2016 | Jacobson et al. | |
| 9,299,294 B2 | 3/2016 | Lin et al. | |
| 9,341,916 B2 | 5/2016 | Telfer et al. | |
| 9,360,733 B2 | 6/2016 | Wang et al. | |
| 9,361,836 B1 | 6/2016 | Telfer et al. | |
| 9,373,289 B2 | 6/2016 | Sprague et al. | |
| 9,383,623 B2 | 7/2016 | Lin et al. | |
| 9,390,066 B2 | 7/2016 | Smith | |
| 9,390,661 B2 | 7/2016 | Chiu et al. | |
| 9,412,314 B2 | 8/2016 | Amundson et al. | |
| 9,423,666 B2 | 8/2016 | Wang et al. | |
| 9,459,510 B2 | 10/2016 | Lin | |
| 9,460,666 B2 | 10/2016 | Sprague et al. | |
| 9,495,918 B2 | 11/2016 | Harrington et al. | |
| 9,501,981 B2 | 11/2016 | Lin et al. | |
| 9,513,527 B2 | 12/2016 | Chan et al. | |
| 9,513,743 B2 | 12/2016 | Sjodin et al. | |
| 9,514,667 B2 | 12/2016 | Lin | |
| 9,541,814 B2 | 1/2017 | Lin et al. | |
| 9,542,895 B2 | 1/2017 | Gates et al. | |
| 9,564,088 B2 | 2/2017 | Wilcox et al. | |
| 9,612,502 B2 | 4/2017 | Danner et al. | |
| 9,620,048 B2 | 4/2017 | Sim et al. | |
| 9,620,067 B2 | 4/2017 | Harrington et al. | |
| 9,671,668 B2 | 6/2017 | Chan et al. | |
| 9,672,766 B2 | 6/2017 | Sjodin | |
| 9,691,333 B2 | 6/2017 | Cheng et al. | |
| 9,697,778 B2 | 7/2017 | Telfer et al. | |
| 9,721,495 B2 | 8/2017 | Harrington et al. | |
| 9,740,076 B2 | 8/2017 | Paolini et al. | |
| 9,759,980 B2 | 9/2017 | Du et al. | |
| 9,792,861 B2 | 10/2017 | Chang et al. | |
| 9,792,862 B2 | 10/2017 | Hung et al. | |
| 9,812,073 B2 | 11/2017 | Lin et al. | |
| 9,835,925 B1 | 12/2017 | Bull et al. | |
| 9,921,451 B2 * | 3/2018 | Telfer | G02F 1/1685 |
| 9,966,018 B2 | 5/2018 | Gates et al. | |
| 10,162,242 B2 | 12/2018 | Wang et al. | |
| 10,209,556 B2 | 2/2019 | Rosenfeld et al. | |
| 10,229,641 B2 | 3/2019 | Yang et al. | |
| 10,276,109 B2 | 4/2019 | Crounse et al. | |
| 10,319,313 B2 | 6/2019 | Harris et al. | |
| 10,339,876 B2 | 7/2019 | Lin et al. | |
| 10,353,266 B2 * | 7/2019 | Bouchard | G09G 3/2044 |
| 10,380,955 B2 | 8/2019 | Lin | |
| 10,444,553 B2 | 10/2019 | Laxton | |
| 10,467,984 B2 | 11/2019 | Buckley et al. | |
| 10,514,583 B2 | 12/2019 | Zhang | |
| 10,593,272 B2 | 3/2020 | Telfer et al. | |
| 10,672,350 B2 | 6/2020 | Amundson et al. | |
| 10,891,906 B2 * | 1/2021 | Lin | G09G 3/344 |
| 11,049,463 B2 | 6/2021 | Lin et al. | |
| 11,460,722 B2 | 10/2022 | Telfer et al. | |
| 11,620,959 B2 | 4/2023 | Deliwala | |
| 11,640,803 B2 | 5/2023 | Lin et al. | |
| 11,756,494 B2 | 9/2023 | Paykin et al. | |
| 11,776,496 B2 | 10/2023 | Telfer et al. | |
| 11,935,495 B2 * | 3/2024 | Chen | G09G 3/344 |
| 12,131,713 B2 | 10/2024 | Deliwala et al. | |
| 12,461,081 B1 * | 11/2025 | Postrel | G01N 33/0047 |

| | | | |
|---|---|---|---|
| 2003/0102858 A1 * | 6/2003 | Jacobson | G02F 1/1685 |
| | | | 324/537 |
| 2004/0246562 A1 | 12/2004 | Chung et al. | |
| 2005/0024353 A1 * | 2/2005 | Amundson | G09G 3/344 |
| | | | 345/204 |
| 2005/0212747 A1 * | 9/2005 | Amundson | G09G 3/344 |
| | | | 345/107 |
| 2005/0253777 A1 | 11/2005 | Zehner et al. | |
| 2007/0091418 A1 | 4/2007 | Danner et al. | |
| 2007/0103427 A1 | 5/2007 | Zhou et al. | |
| 2007/0176912 A1 | 8/2007 | Beames et al. | |
| 2008/0024429 A1 | 1/2008 | Zehner | |
| 2008/0024482 A1 | 1/2008 | Gates et al. | |
| 2008/0043318 A1 | 2/2008 | Whitesides et al. | |
| 2008/0048970 A1 | 2/2008 | Drzaic et al. | |
| 2008/0136774 A1 | 6/2008 | Harris et al. | |
| 2008/0303780 A1 | 12/2008 | Sprague et al. | |
| 2009/0174651 A1 | 7/2009 | Jacobson et al. | |
| 2009/0225398 A1 | 9/2009 | Duthaler et al. | |
| 2009/0322663 A1 * | 12/2009 | Nose | G09G 3/3629 |
| | | | 345/89 |
| 2009/0322721 A1 | 12/2009 | Zehner et al. | |
| 2010/0156780 A1 | 6/2010 | Jacobson et al. | |
| 2010/0188380 A1 * | 7/2010 | Nose | G09G 3/3614 |
| | | | 345/209 |
| 2010/0194733 A1 | 8/2010 | Lin et al. | |
| 2010/0194789 A1 | 8/2010 | Lin et al. | |
| 2010/0220121 A1 | 9/2010 | Zehner et al. | |
| 2010/0265561 A1 | 10/2010 | Gates et al. | |
| 2011/0043543 A1 | 2/2011 | Chen et al. | |
| 2011/0063314 A1 | 3/2011 | Chiu et al. | |
| 2011/0193840 A1 | 8/2011 | Amundson et al. | |
| 2011/0193841 A1 | 8/2011 | Amundson et al. | |
| 2011/0199671 A1 | 8/2011 | Amundson et al. | |
| 2011/0216055 A1 * | 9/2011 | Chiu | G09G 5/00 |
| | | | 345/212 |
| 2011/0221740 A1 | 9/2011 | Yang et al. | |
| 2012/0001957 A1 | 1/2012 | Liu et al. | |
| 2012/0098740 A1 | 4/2012 | Chiu et al. | |
| 2012/0326957 A1 | 12/2012 | Drzaic et al. | |
| 2013/0063333 A1 | 3/2013 | Arango et al. | |
| 2013/0242378 A1 | 9/2013 | Paolini, Jr. et al. | |
| 2013/0249782 A1 | 9/2013 | Wu et al. | |
| 2013/0278995 A1 | 10/2013 | Drzaic et al. | |
| 2014/0009817 A1 | 1/2014 | Wilcox et al. | |
| 2014/0055840 A1 | 2/2014 | Zang et al. | |
| 2014/0078576 A1 | 3/2014 | Sprague | |
| 2014/0204012 A1 | 7/2014 | Wu et al. | |
| 2014/0240210 A1 | 8/2014 | Wu et al. | |
| 2014/0253425 A1 | 9/2014 | Zalesky et al. | |
| 2014/0293398 A1 | 10/2014 | Wang et al. | |
| 2014/0362213 A1 | 12/2014 | Tseng | |
| 2015/0005720 A1 | 1/2015 | Zang | |
| 2015/0118390 A1 | 4/2015 | Rosenfeld et al. | |
| 2015/0262255 A1 | 9/2015 | Khajehnouri et al. | |
| 2015/0262551 A1 | 9/2015 | Zehner et al. | |
| 2015/0268531 A1 | 9/2015 | Wang et al. | |
| 2015/0301246 A1 | 10/2015 | Zang et al. | |
| 2016/0012710 A1 | 1/2016 | Lu et al. | |
| 2016/0048054 A1 | 2/2016 | Danner | |
| 2016/0091770 A1 * | 3/2016 | Bouchard | G09G 3/344 |
| | | | 359/296 |
| 2016/0140910 A1 | 5/2016 | Amundson | |
| 2016/0180777 A1 | 6/2016 | Lin et al. | |
| 2016/0275874 A1 * | 9/2016 | Lin | G09G 3/2011 |
| 2016/0372054 A1 * | 12/2016 | Yamazaki | G09G 3/344 |
| 2018/0197486 A1 * | 7/2018 | Telfer | G09G 3/344 |
| 2019/0272792 A1 * | 9/2019 | Lin | G09G 3/344 |
| 2019/0333454 A1 * | 10/2019 | Lin | G09G 3/2003 |
| 2021/0132459 A1 | 5/2021 | Bull | |
| 2022/0082896 A1 * | 3/2022 | Telfer | G02F 1/1676 |
| 2022/0139338 A1 * | 5/2022 | Paykin | G02F 1/16757 |
| 2023/0004061 A1 * | 1/2023 | Telfer | G02F 1/167 |
| 2023/0056258 A1 * | 2/2023 | Chen | G09G 3/344 |
| 2023/0359100 A1 * | 11/2023 | Ueyama | G02F 1/291 |
| 2024/0402562 A1 * | 12/2024 | Telfer | G09G 3/344 |
| 2025/0006146 A1 * | 1/2025 | Sim | G09G 3/344 |

* cited by examiner

VIEWING SURFACE

WCMY

| White | White | White | White | White | White | White | White |
|-------|-------|-------|-------|-------|-------|-------|-------|
| Cyan | Cyan | Cyan | Cyan | Yellow | Magenta | Cyan | Magenta |
| Yellow | Magenta | Yellow | Yellow | Magenta | Yellow | Cyan | Yellow |
| Magenta | | Magenta | | | | | |

Yellow · Magenta · Magenta · Cyan · Yellow · Cyan

NON-VIEWING SURFACE

| White | Yellow | Red | Magenta | Blue | Cyan | Green | Black |
|-------|--------|-----|---------|------|------|-------|-------|
| [A] | [B] | [C] | [D] | [E] | [F] | [G] | [H] |

FIG. 4A

WRYB*

| VIEWING SURFACE | | | | | | |
|---|---|---|---|---|---|---|
| White | Red | Yellow/Red | Yellow | Yellow/Blue | Blue | Blue |
| Yellow | Blue | White | White | White | White | Red |
| Blue | Yellow | Red | Red | Red | Red | White |
| Red | White | | Blue | | Yellow | Yellow |

| NON-VIEWING SURFACE | | | | | | |
|---|---|---|---|---|---|---|
| White | Red | Orange | Yellow | Green | Blue | Black |
| [A] | [B] | [C] | [D] | [E] | [F] | [G] |

FIG. 4B

FAST RESPONSE COLOR WAVEFORMS FOR MULTIPARTICLE ELECTROPHORETIC DISPLAYS

RELATED APPLICATIONS

This application claims priority to U.S. Provisional Patent Application No. 63/610,506, filed Dec. 15, 2024. All patents and publications disclosed herein are incorporated by reference in their entireties.

BACKGROUND

An electrophoretic display (EPD) changes color by modifying the position of a charged colored particle with respect to a light-transmissive viewing surface. Such electrophoretic displays are typically referred to as "electronic paper" or "ePaper" because the resulting display has high contrast and is sunlight-readable, much like ink on paper. In the simplest sense, an electrophoretic display only requires a light-transmissive electrode at the viewing surface, a back electrode, and an electrophoretic medium including one or more types of charged colored particles. If the back electrode includes controllable regions (pixels)—either segmented electrodes or an active matrix of pixel electrodes controlled by transistors—a pattern can be made to appear electronically at the viewing surface. The pattern can be, for example, the text to a book.

A variety of color option have become commercially available for electrophoretic displays, including four color displays (black, white, red, yellow; red, white, yellow, semi-transparent blue; cyan, yellow, magenta, white). Electrophoretic displays with four types of electrophoretic particles operate similar to the simple black and white displays EPDs when, for example, a single color matching the color of one of the particles is desired at the viewing surface. However, obtaining a broader color gamut, including mixed colors and process colors is more complicated and requires more exquisite control of the relative positions of the particles with respect to each other and the viewing surface. When done correctly, such four particle systems allow hundreds of different colors to be produced at each pixel. More details of such systems are available in the following U.S. patents, all of which are incorporated by reference in their entireties: U.S. Pat. Nos. 9,361,836, 9,921,451, 10,276, 109, 10,353,266, 10,467,984, and 10,593,272.

For the most part, electrophoretic media, such as described above, are designed to be driven with low voltage square waves, such as produced by a driver circuit from a thin-film-transistor backplane. Such driver circuits can be inexpensively mass-produced because they are very closely related to the driving circuitry and fabrication methods that are used to produce liquid crystal display panels, such as found in smart phones, laptop monitors, and televisions. Historically, even when electrophoretic media are driven directly via an isolated electrode (e.g., segmented electrode) the driving pulses are delivered as square waves, having an amplitude and a time width. See, for example, U.S. Pat. No. 7,012,600, incorporated by reference in its entirety. Typically, for an active matrix backplane including an array of pixel electrodes, each pixel electrode will receive a signal pulse (square wave) for a short period of time as the array of pixel electrodes are addressed in a line-by-line fashion. The period of time that it takes to update the entire array of pixels, and also the time between updates of an individual pixel electrode is known as a frame. The collection of voltage impulses required to change the display from a first display state to a second state is generally known as a waveform. A waveform typically includes at least three frames, e.g., as described in U.S. Pat. No. 11,620,959, which is incorporated by reference in its entirety.

When the electrophoretic medium includes multiple types of particles with the same charge polarity but different charge magnitudes, the final position of a given set of particles (and the optical state) is typically controlled with a sequence of positive and negative voltage impulses. For example, all of the positive particles may be driven to the viewing surface and then a combination of negative and positive voltages serves to disaggregate the collection of positive particles and drive the unwanted positive particles away from the view surface so that only the desired particle sets are viewed. However, driving methods that require multiple positive and negative pulses often result in color transitions that are visibly jarring to a user, also known as "flashy updates." It is possible to decrease the amount of flash by making the waveforms longer and using smaller voltage steps, however such waveforms are not suitable for applications such as page turning or stylus writing. In such applications, a user expects a nearly instantaneous response by the display and high contrast between first and second optical states. (See, e.g., U.S. Patent Publication No. 2022/0262323 for a description of long gradual waveforms.) Historically, it has been difficult to achieve a short, low flash, low latency color waveform for such multi-particle systems.

The term gray state is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate gray state would actually be pale blue. Indeed, as already mentioned, the change in optical state may not be a color change at all. The terms black and white may be used hereinafter to refer to the two extreme optical states of a display, and should be understood as normally including extreme optical states which are not strictly black and white, for example the aforementioned white and dark blue states.

The terms bistable and bistability are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called multi-stable rather than bistable, although for convenience the term bistable may be used herein to cover both bistable and multi-stable displays.

The term impulse, when used to refer to driving an electrophoretic display, is used herein to refer to the integral of the applied voltage with respect to time during the period in which the display is driven. The term waveform, when used to refer to driving an electrophoretic display is used to describe a series or pattern of voltages provided to an electrophoretic medium over a given time period (seconds, frames, etc.) to produce a desired optical effect in the electrophoretic medium.

A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the electrophoretic media and displays of the present invention.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation color adjustment; see for example U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502; 7,167,155; 7,385,751; 7,492,505; 7,667,684; 7,684,108; 7,791,789; 7,800,813; 7,821,702; 7,839,564; 7,910,175; 7,952,790; 7,956,841; 7,982,941; 8,040,594; 8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605,354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,170,468; 9,182,646; 9,195,111; 9,199,441; 9,268,191; 9,285,649; 9,293,511; 9,341,916; 9,360,733; 9,361,836; 9,383,623; and 9,423,666; and U.S. Patent Applications Publication Nos. 2008/0043318; 2008/0048970; 2009/0225398; 2010/0156780; 2011/0043543; 2012/0326957; 2013/0242378; 2013/0278995; 2014/0055840; 2014/0078576; 2014/0340430; 2014/0340736; 2014/0362213; 2015/0103394; 2015/0118390; 2015/0124345; 2015/0198858; 2015/0234250; 2015/0268531; 2015/0301246; 2016/0011484; 2016/0026062; 2016/0048054; 2016/0116816; 2016/0116818; and 2016/0140909;

(h) Methods for driving displays; see for example U.S. Pat. Nos. 5,930,026; 6,445,489; 6,504,524; 6,512,354; 6,531,997; 6,753,999; 6,825,970; 6,900,851; 6,995, 550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,514,168; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0091418; 2007/0103427; 2007/0176912; 2008/0024429; 2008/0024482; 2008/0136774; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2015/0262551; 2016/0071465; 2016/0078820; 2016/0093253; 2016/0140910; and 2016/0180777;

(i) Applications of displays; see for example U.S. Pat. Nos. 7,312,784 and 8,009,348; and (j) Non-electrophoretic displays, as described in U.S. Pat. Nos. 6,241,921; and U.S. Patent Applications Publication Nos. 2015/0277160; and U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449.

Although electrophoretic media are often opaque (since, for example, in many electrophoretic media, the particles substantially block transmission of visible light through the display) and operate in a reflective mode, many electrophoretic displays can be made to operate in a so-called shutter mode in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode can be used in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively. Additionally, as described in U.S. patent application Ser. No. 17/088,762, encapsulated electrophoretic media can be incorporated into non-planar surfaces that are, in turn, incorporated into everyday objects. As a result, surfaces of products, building materials, etc. can be engineered to change color when a suitable electric field is supplied.

SUMMARY

Disclosed herein are improved methods for fast, high-contrast driving of an electrophoretic medium comprising at least four types of particles, wherein each particle has a different optical property from each other, and each type of particle has a different combination of charge polarity and charge magnitude from each other. In one aspect, the invention includes a method of causing a color state transition in a four-particle electrophoretic display. The electrophoretic medium of the display typically includes one negative particle set and three different positive particle sets, wherein each particle set is a different color and one of the particle sets is white in color. Typically, the display is configured to provide at least five voltages to pixel electrodes of the display, V++, V+, 0, V−, and V−−, and the method comprises providing a first sequence including at least three sequential frames of a same polarity (+ or −), wherein a first frame of the first sequence is at a respective highest voltage (V++, V−−); providing a second sequence including at least three sequential frames of an opposite polarity (− or +); and providing a third sequence including at least one frame of the same polarity (+ or −) or zero volts. In some embodiments, the first sequence includes frames at V++ and V+, or at V−− and V−. In some embodiments, the second sequence includes frames at V−− and V−, or at V++ and V+. In some embodiments, the display is further configured to provide an additional positive voltage between V++ and 0 and an additional negative voltage between V−− and 0, and the first sequence includes frames at the additional positive voltage between V++ and 0 or at the additional negative voltage between V−− and 0. In some embodiments, the display is further configured to provide an additional positive voltage between V++ and 0 and an additional negative voltage between V−− and 0, and the second sequence includes frames at the additional negative voltage between V−− and 0 or at the additional positive voltage between V−− and 0. In some embodiments, the voltages are V++=24V, V+=6V, 0V, V−=−6V, and V−−=−24V, and the additional positive voltage between V++ and 0 is +12V, and the additional negative voltage between V−− and 0 is −12V. In some embodiments, the voltages are V++=24V, V+=6V, 0V, V−=−6V, and V−−=−24V, and the additional positive voltage between V++ and 0 is +12V, and the additional negative voltage between V−− and 0 is −12V. In some embodiments, the third sequence terminates with a frame of 0V. In some embodiments, the display starts from an initial white state condition in which the white particles are present at a viewing surface of the display. In some embodiments, the elapsed time for transition from white state to a final color at the viewing surface is less than 300 ms or less than 250 ms. In some embodiments, each frame is less than 20 ms in time or less than 15 ms in time or less than 10 ms in time.

In another aspect, the invention includes a method of causing a color state transition in a four-particle electrophoretic display. The electrophoretic medium of the display typically includes two negative particle sets and two different positive particle sets, wherein each particle set is a different color and one of the particle sets is white in color. Typically, the display is configured to provide at least five voltages to pixel electrodes of the display, V++, V+, 0, V−, and V−−. The method includes providing a first sequence including at least three sequential frames of a same polarity (+ or −), wherein a first frame of the first sequence is at a respective highest voltage (V++, V−−), providing a second sequence including at least three sequential frames of an opposite polarity (− or +), and providing a third sequence including at least one frame of the same polarity (+ or −) or zero volts. In some embodiments, the first sequence includes frames at V++ and V+, or at V−− and V−. In some embodiments, the second sequence includes frames at V−− and V−, or at V++ and V+. In some embodiments, the display is further configured to provide an additional positive voltage between V++ and 0 and an additional negative voltage between V−− and 0, and the first sequence includes frames at the additional positive voltage between V++ and 0 or at the additional negative voltage between V−− and 0. In some embodiments, the display is further configured to provide an additional positive voltage between V++ and 0 and an additional negative voltage between V−− and 0, and the second sequence includes frames at the additional negative voltage between V−− and 0 or at the additional positive voltage between V−− and 0. In some embodiments, the voltages are V++=24V, V+=6V, 0V, V−=−6V, and V−−=−24V, and the additional positive voltage between V++ and 0 is +12V, and the additional negative voltage between V−− and 0 is −12V. In some embodiments, the voltages are V++=24V, V+=6V, 0V, V−=−6V, and V−−=−24V, and the additional positive voltage between V++ and 0 is +12V, and the additional negative voltage between V−− and 0 is −12V. In some embodiments, the third sequence terminates with a frame of 0V. In some embodiments, the display starts from an initial white state condition in which the white particles are present at a viewing surface of the display. In some embodiments, the elapsed time for transition from white state to a final color at the viewing surface is less than 300 ms or less than 250 ms. In some embodiments, each frame is less than 20 ms in time or less than 15 ms in time or less than 10 ms in time.

In another aspect, the invention includes a method of causing a color state transition in a four-particle electrophoretic display. The electrophoretic medium of the display typically includes one positive particle set and three different negative particle sets, wherein each particle set is a different color and one of the particle sets is white in color. Typically, the display is configured to provide at least five voltages to pixel electrodes of the display, V++, V+, 0, V−, and V−−. The method includes providing a first sequence including at least three sequential frames of a same polarity (+ or −), wherein a first frame of the first sequence is at a respective highest voltage (V++, V−−), providing a second sequence including at least three sequential frames of an opposite polarity (− or +), and providing a third sequence including at least one frame of the same polarity (+ or −) or zero volts. In some embodiments, the first sequence includes frames at V++ and V+, or at V−− and V−. In some embodiments, the second sequence includes frames at V−− and V−, or at V++ and V+. In some embodiments, the display is further configured to provide an additional positive voltage between V++ and 0 and an additional negative voltage between V−− and 0, and the first sequence includes frames at the additional positive voltage between V++ and 0 or at the additional negative voltage between V−− and 0. In some embodiments, the display is further configured to provide an additional positive voltage between V++ and 0 and an additional negative voltage between V−− and 0, and the second sequence includes frames at the additional negative voltage between V−− and 0 or at the additional positive voltage between V−− and 0. In some embodiments, the voltages are V++=24V, V+=6V, 0V, V−=−6V, and V−−=−24V, and the additional positive voltage between V++ and 0 is +12V, and the additional negative voltage between V−− and 0 is −12V. In some embodiments, the voltages are V++=24V, V+=6V, 0V, V−=−6V, and V−−=−24V, and the additional positive voltage between V++ and 0 is +12V, and the additional negative voltage between V−− and 0 is −12V. In some embodiments, the third sequence terminates with a frame of 0V. In some embodiments, the display starts from an initial white state condition in which the white particles are present at a viewing surface of the display. In some embodiments, the elapsed time for transition from white state to a final color at the viewing surface is less than 300 ms or less than 250 ms. In some embodiments, each frame is less than 20 ms in time or less than 15 ms in time or less than 10 ms in time.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 4A illustrates the preferred position of each of the four sets of particles to produce eight standard colors in a white-cyan-magenta-yellow (WCMY) four-particle electrophoretic display, wherein the white particles are reflective and the cyan, magenta, and yellow particles are absorptive.

FIG. 4B illustrates the preferred position of each of the four sets of particles to produce seven standard colors in a white-red-yellow-blue semi-absorptive (WRYB*) four-particle electrophoretic display, wherein the white, red, and yellow particles are reflective and the blue particle is semi-absorptive (B*).

DETAILED DESCRIPTION

Figure 1A:
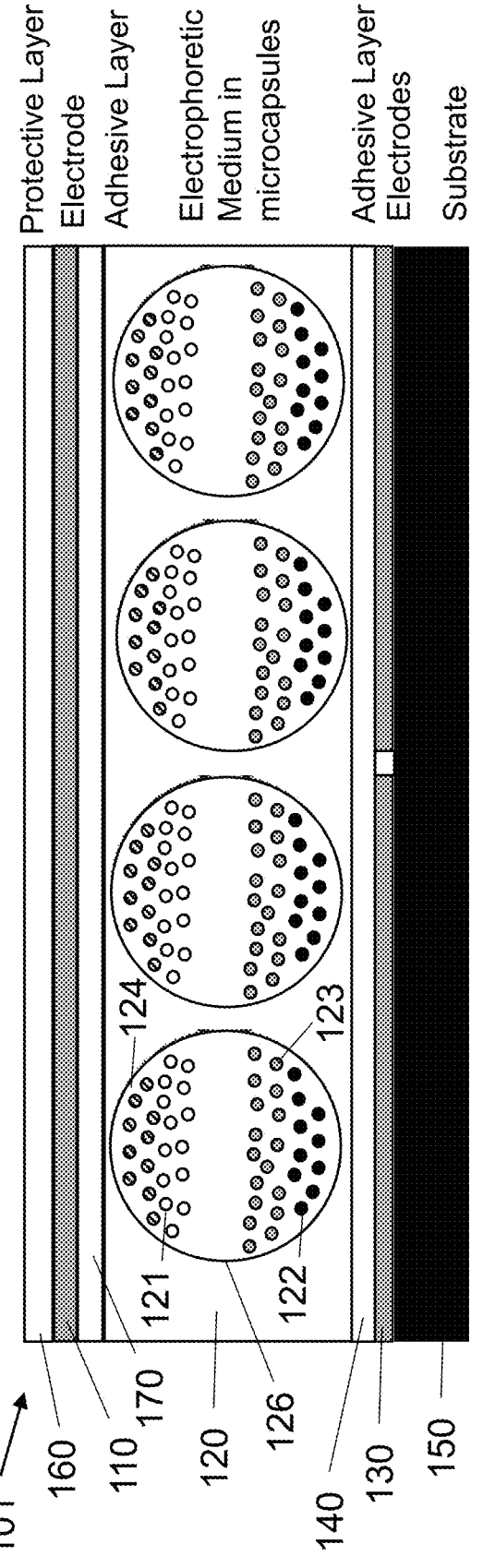
FIG. 1A is a representative cross-section of a four-particle electrophoretic display wherein the electrophoretic medium is encapsulated in microcapsules.

The invention details fast response color waveforms for driving multi-particle color electrophoretic media to improve the user experience of a display, e.g. a tablet, monitor, or interactive sign, incorporating multi-particle color electrophoretic media. In particular the waveforms result in a sharp and immediate response, which is preferred when writing with a stylus, or typing on a keyboard, or interacting with an icon on an interactive sign, such as a timetable. Typically, multi-particle color electrophoretic media have at least four different electrophoretic particle sets, for example, wherein at least three of the particle sets are colored and subtractive and at least one of the particles is scattering/reflective, or when at least three of the particle sets are colored and reflective and at least one of the particles is subtractive or semi-transparent. Typically, such a system includes a reflective white particle set and cyan, yellow, and magenta subtractive primary-colored particle sets; or red, yellow, and blue reflective particle sets and an absorptive black particle set; or white, red, and yellow reflective particle sets and a semi-transparent blue particle set (alternatively, white, blue, and yellow reflective particle sets and a semi-transparent red particle set). Of course, alternative color choices can be used provided that suitable primary colors are chosen. Additionally, the fast response color waveforms for driving such multi-particle systems are applicable to electrophoretic display systems including more and different types of particles, such as five-particle, six-particle, seven-particle, and eight-particle systems.

Methods for fabricating an electrophoretic display including four (or more) particles have been discussed in the prior art. The electrophoretic fluid may be encapsulated in microcapsules or incorporated into microcell structures that are thereafter sealed with a polymeric layer. The microcapsule or microcell layers may be coated or laminated to a plastic substrate or film bearing a transparent coating of an electrically conductive material. Alternatively, the microcapsules may be coated onto a light transmissive substrate or other electrode material using spraying techniques. (See U.S. Pat. No. 9,835,925, incorporated by reference herein). The resulting assembly may be laminated to a backplane bearing pixel electrodes using an electrically conductive adhesive. The assembly may alternatively be attached to one or more segmented electrodes on a backplane, wherein the segmented electrodes are driven directly. In another embodiment the assembly, which may include a non-planar light transmissive electrode material is spray coated with capsules and then overcoated with a back electrode material. (See U.S. Patent Publication No. 2021/0132459, incorporated by reference herein.) Alternatively, the electrophoretic fluid may be dispensed directly on a thin open-cell grid that has been arranged on a backplane including an active matrix of pixel electrodes. The filled grid can then be top-sealed with an integrated protective sheet/light-transmissive electrode.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

Electrophoretic media used herein include charged particles that vary in color, reflective or absorptive properties, charge density, and mobility in an electric field (measured as a zeta potential). A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the electrophoretic media and displays of the present invention. For example, the electrophoretic medium might include a fluid, a plurality of first and a plurality of second particles dispersed in the fluid, the first and second particles bearing charges of opposite polarity, the first particle being a light-scattering particle and the second particle having one of the subtractive primary colors, and a plurality of third and a plurality of fourth particles dispersed in the fluid, the third and fourth particles bearing charges of opposite polarity, the third and fourth particles each having a subtractive primary color different from each other and from the second particles, wherein the electric field required to separate an aggregate formed by the third and the fourth particles is greater than that required to separate an aggregate formed from any other two types of particles.

The electrophoretic media of the present invention may contain any of the additives used in prior art electrophoretic media as described for example in the E Ink and MIT patents and applications mentioned above. Thus, for example, the electrophoretic medium of the present invention will typically comprise at least one charge control agent to control the charge on the various particles, and the fluid may have dissolved or dispersed therein a polymer having a number average molecular weight in excess of about 20,000 and being essentially non-absorbing on the particles to improves the bistability of the display, as described in the aforementioned U.S. Pat. No. 7,170,670.

In one embodiment, the present invention uses a light-scattering particle, typically white, and three substantially non-light-scattering particles. There is of course no such thing as a completely light-scattering particle or a completely non-light-scattering particle, and the minimum degree of light scattering of the light-scattering particle, and the maximum tolerable degree of light scattering tolerable in the substantially non-light-scattering particles, used in the electrophoretic of the present invention may vary somewhat depending upon factors such as the exact pigments used, their colors and the ability of the user or application to tolerate some deviation from ideal desired colors. The scattering and absorption characteristics of a pigment may be assessed by measurement of the diffuse reflectance of a sample of the pigment dispersed in an appropriate matrix or liquid against white and dark backgrounds. Results from such measurements can be interpreted according to a number of models that are well-known in the art, for example, the one-dimensional Kubelka-Munk treatment. In the present invention, it is preferred that the white pigment exhibit a diffuse reflectance at 550 nm, measured over a black background, of at least 5% when the pigment is approximately isotropically distributed at 15% by volume in a layer of thickness 1 μm comprising the pigment and a liquid of refractive index less than 1.55. The yellow, magenta and cyan pigments preferably exhibit diffuse reflectances at 650, 650 and 450 nm, respectively, measured over a black background, of less than 2.5% under the same conditions. (The wavelengths chosen above for measurement of the yellow, magenta and cyan pigments correspond to spectral regions of minimal absorption by these pigments.) Colored pigments meeting these criteria are hereinafter referred to as "non-scattering" or "substantially non-light-scattering". Specific examples of suitable particles are disclosed in U.S. Pat. Nos. 9,921,451, which is incorporated by reference herein.

Alternative particle sets may also be used, including four sets of reflective particles, or one absorptive particle with three or four sets of different reflective particles, i.e., such as described in U.S. Pat. Nos. 9,922,603 and 10,032,419, which are incorporated by reference herein. For example, white particles may be formed from an inorganic pigment, such as $TiO_2$, $ZrO_2$, ZnO, $Al_2O_3$, $Sb_2O_3$, $BaSO_4$, $PbSO_4$ or the like, while black particles may be formed from CI pigment black 26 or 28 or the like (e.g., manganese ferrite black spinel or copper chromite black spinel) or carbon black. The third/fourth/fifth type of particles may be of a color such as red, green, blue, magenta, cyan or yellow. The pigments for this type of particles may include, but are not limited to, CI pigment PR 254, PR122, PR149, PG36, PG58, PG7, PB28, PB15:3, PY138, PY150, PY155 or PY20. Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

Figure 1B:
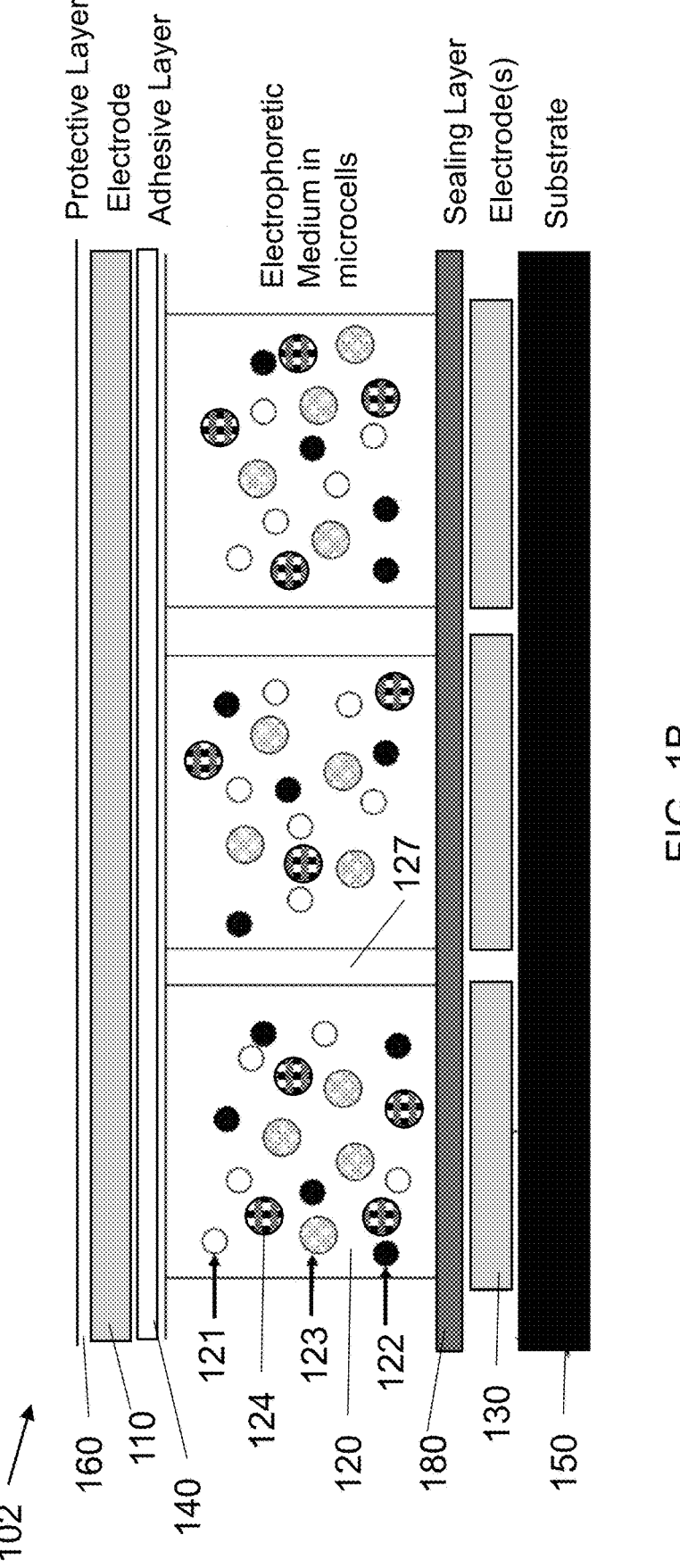
FIG. 1B is a representative cross-section of a four-particle electrophoretic display wherein the electrophoretic medium is encapsulated in microcells.

As shown in FIG. 1A and FIG. 1B, an electrophoretic display (101, 102) typically includes a top transparent electrode 110, an electrophoretic medium 120, and a bottom electrode 130, which is often a pixel electrode of an active matrix of pixels controlled with thin film transistors (TFT). However, the bottom electrode 130 can be a singular larger electrode, such as a graphite backplane, a film of PET/ITO, a metalized film, or a conductive paint. In the electrophoretic media 120 described herein, there are four different types of particles, 121, 122, 123, and 124, however more particle sets can be used with the methods and displays described herein. In some embodiments, two of the four different types of particle sets, 121, 122, 123, and 124 are of first polarity, while the other two sets are of a second (opposite) polarity. In some embodiments, one of the four different types of particle sets, 121, 122, 123, and 124 is of first polarity, while the other three sets are of a second (opposite) polarity. The electrophoretic medium 120 is typically compartmentalized such by a microcapsule 126 or the walls of a microcell 127. An optional adhesive layer 140 can be disposed adjacent any of the layers, however, it is typically adjacent an electrode layer (110 or 130). There may be more than one adhesive layer 140 in a given electrophoretic display (105, 106), however only one layer is more common. The entire display stack is typically disposed on a substrate 150, which may be rigid or flexible. The display (101, 102) typically also includes a protective layer 160, which may simply protect the top electrode 110 from damage, or it may envelop the entire display (101, 102) to prevent ingress of water, etc. Electrophoretic displays (101, 102) may also include sealing layers 180 as needed. In some embodiments the adhesive layer 140 may include a primer component to improve adhesion to the electrode layer 110, or a separate primer layer (not shown in FIG. 1B) may be used. The structures of electrophoretic displays and the component parts, pigments, adhesives, electrode materials, etc., are described in many patents and patent applications published by E Ink Corporation, such as U.S. Pat. Nos. 6,922,276; 7,002,728; 7,072,095; 7,116,318; 7,715,088; and 7,839,564, all of which are incorporated by reference herein in their entireties.

In some embodiments, e.g., as shown in FIG. 1A, the electrophoretic display may include only a first light-transmissive electrode, an electrophoretic medium, and a second (rear) electrode, which may also be light-transmissive. However to produce a high-resolution display, e.g. e.g., as shown in FIG. 1B. Of course, each pixel must be addressable without interference from adjacent pixels so that an image file is faithfully reproduced in the display. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a select voltage such as to ensure that all the transistors in the selected row are conductive, while there is applied to all other rows a non-select voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.)

After a pre-selected interval known as the "line address time" the selected row is deselected, the next row is selected, and the voltages on the column drivers are changed so that the next line of the display is written. This process is repeated so that the entire display is written in a row-by-row manner. The entire process is coordinated with a clock circuit. The time between addressing a pixel for the nth time and the following addressing, n+1, is known as a "frame." Thus, a display that is updated at 60 Hz has frames that are 16 msec. "Frames" are not limited to use with an active matrix backplane, however. The driving frames described herein can also be used to refer to a unit of time between updates of, e.g., a singular backplane. While it is possible to drive electrophoretic media with an analog voltage signal, such as produced by a power supply and a potentiometer, the use of a digital controller discretizes the waveform into blocks that are typically on the order of 10 ms, however shorter or longer framewidths are possible. For example, a frame can be 0.5 ms, or greater, such as 1 ms, 5 ms, 10 ms, 15 ms, 20 ms, 30 ms, or 50 ms. In most instances a frame is less than 100 ms, such 250 ms, 200 ms, 150 ms, or 100 ms. In most applications described herein, the frame is between 5 ms and 30 ms in width, for example 8 ms in width. Specialized drive controllers for electrophoretic displays are available from, e.g., Ultrachip and Rockchip, however programmable voltage drivers can also be used, such as available from Digi-Key and other electronics components suppliers.

In a conventional electrophoretic display using an active matrix backplane, each pixel electrode has associated therewith a capacitor electrode (storage capacitor) such that the pixel electrode and the capacitor electrode form a capacitor; see, for example, International Patent Publication WO 01/07961. In some embodiments, N-type semiconductor (e.g., amorphous silicon) may be used to from the transistors and the "select" and "non-select" voltages applied to the gate electrodes can be positive and negative, respectively.

Figure 2A:
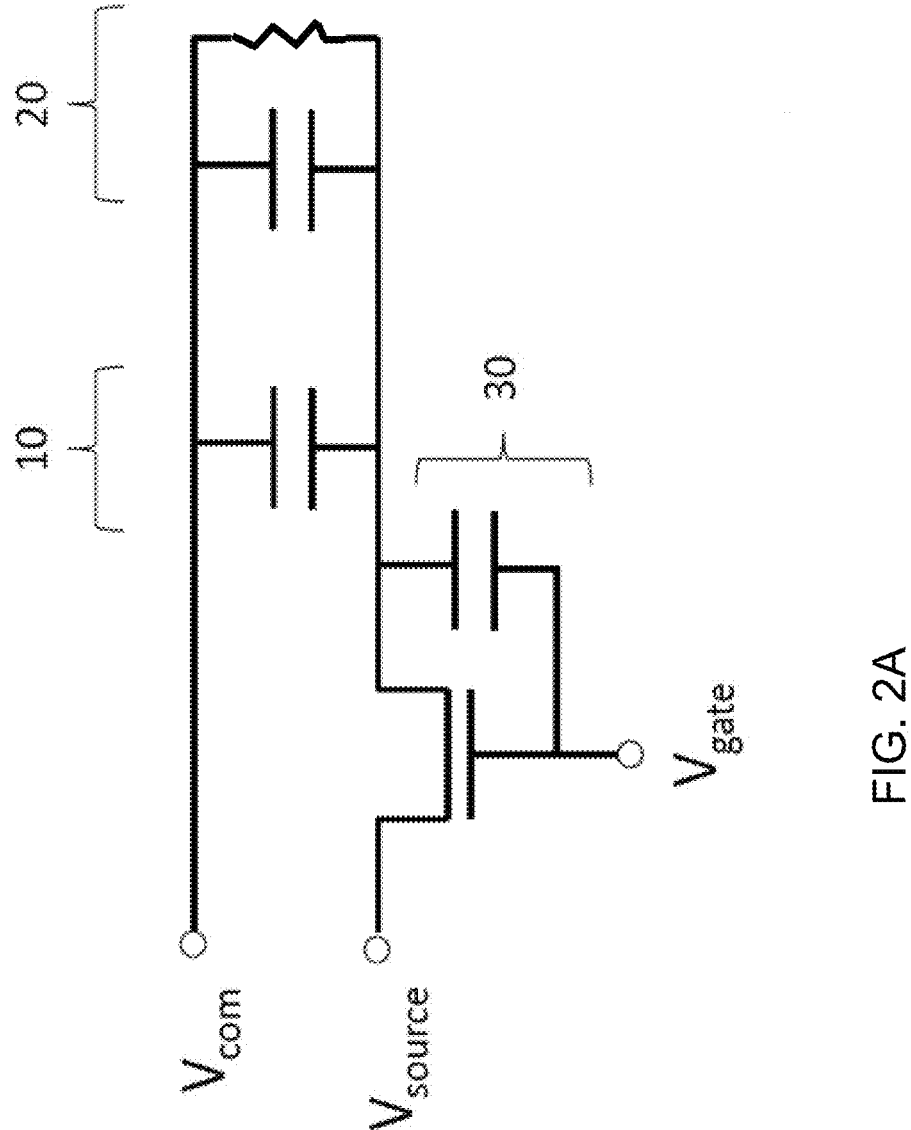
FIG. 2A illustrates an exemplary equivalent circuit of a single pixel of an electrophoretic display that uses an active matrix backplane with a storage capacitor.

FIG. 2A of the accompanying drawings depicts an exemplary equivalent circuit of a single pixel of an electrophoretic display. As illustrated, the circuit includes a capacitor 10 formed between a pixel electrode and a capacitor electrode. The electrophoretic medium 20 is represented as a capacitor and a resistor in parallel. In some instances, direct or indirect coupling capacitance 30 between the gate electrode of the transistor associated with the pixel and the pixel electrode (usually referred to a as a "parasitic capacitance") may create unwanted noise to the display. Usually, the parasitic capacitance 30 is much smaller than that of the storage capacitor 10, and when the pixel rows of a display is being selected or deselected, the parasitic capacitance 30 may result in a small negative offset voltage to the pixel electrode, also known as a "kickback voltage", which is usually less than 2 volts. [In some embodiments, to compensate for the unwanted "kickback voltage", a common potential $V_{com}$, may be supplied to the top plane electrode and the capacitor electrode associated with each pixel, such that, when $V_{com}$ is set to a value equal to the kickback voltage ($V_{KB}$), every voltage supplied to the display may be offset by the same amount, and no net DC-imbalance experienced.]

Figure 2B:
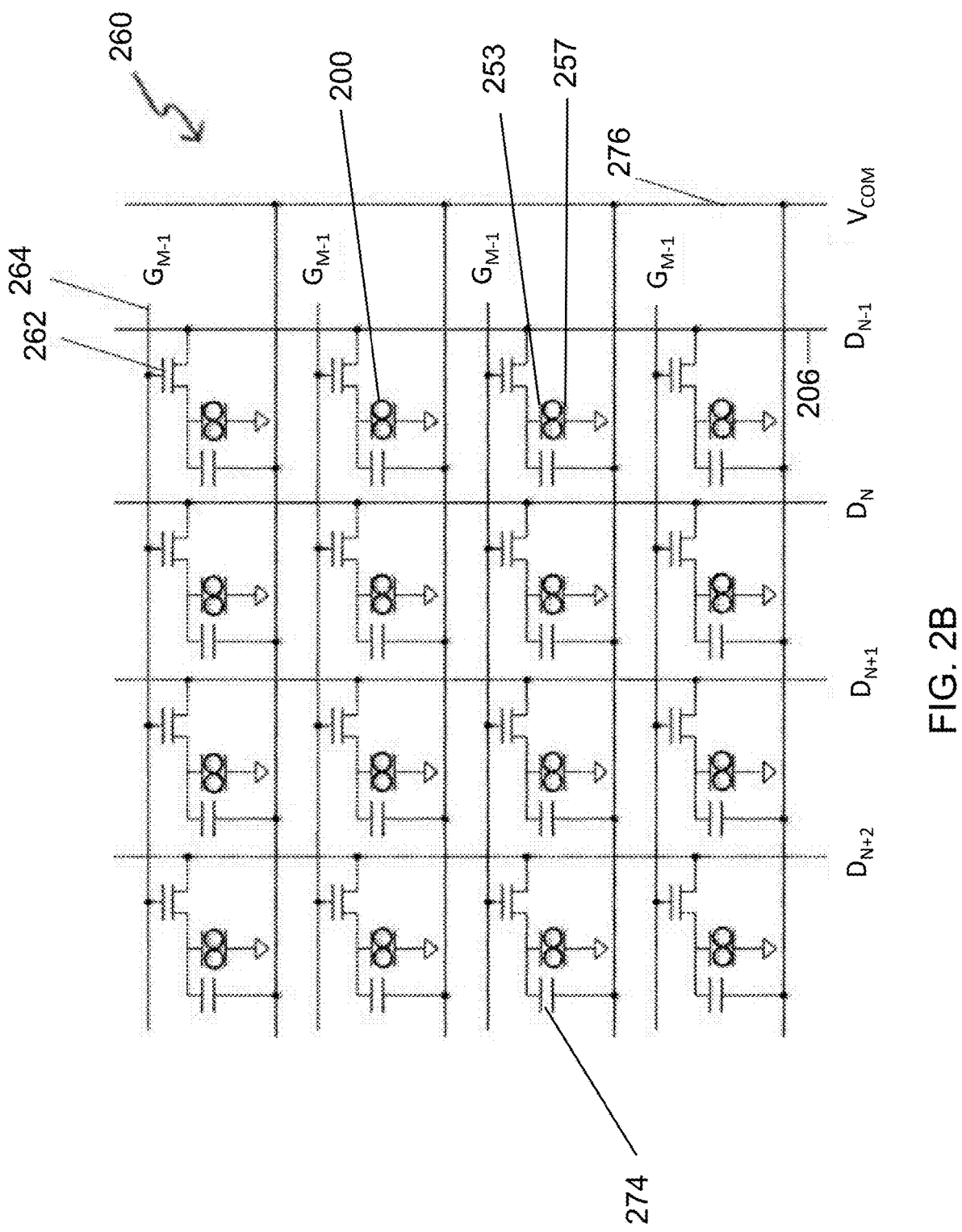
FIG. 2B illustrates an exemplary equivalent circuit of a simplified electrophoretic display of the invention, allowing driving in a row-column format.

In many embodiments, the TFT array forms an active matrix 260 for image driving, as shown in FIG. 2B. For example, each pixel electrode 253 (corresponding to 130 in FIGS. 1A and 1B) is coupled to a thin-film transistor 262 patterned into an array, and connected to gate (row) driver lines 264 and source (column) driver lines 206, running at right angles to the gate drive lines 264. Also, typically, the common (top) light-transparent electrode 257 (corresponding to 110 in FIGS. 1A and 1B) has the form of a single continuous electrode while the other electrode or electrode layer is patterned into a matrix of pixel electrodes 253, each of which defines one pixel of the display. Between the pixel electrode 253 and the common electrode 257, an electrophoretic medium 200 can be disposed. Any of the electrophoretic media above may be used. A source driver (not shown) is connected to the source driver lines 206 and provides source voltage to all TFTs 262 in a column that are to be addressed. A gate driver (not shown) is connected to the gate driver lines 264 to provide a bias voltage that will open (or close) the gates of each TFT 262 along the row. The gate scanning rate is typically ~ 60-150 Hz. When the TFTs 262 are n-type, taking the gate-source voltage positive allows the source voltage to be shorted to the drain. Taking the gate negative with respect to the source causes the drain source current to drop and the drain effectively floats. Because the scan driver acts in a sequential fashion, there is typically some measurable delay in update time between the top and bottom row electrodes. It is understood that the assignment of "row" and "column" electrodes is somewhat arbitrary and that a TFT array could be fabricated with the roles of the row and column electrodes interchanged. Each pixel of the active matrix 260 also includes a storage capacitor 274 as discussed above with respect to FIG. 2A. The storage capacitors 274 are typically coupled to $V_{com}$ line 276. In some embodiments the common light-transparent electrode 257 is coupled to ground, as shown in FIG. 2B. In other embodiments, the common light-transparent electrode 257 is also coupled to $V_{com}$ line 276 (not shown in FIG. 2B).

Figure 3:
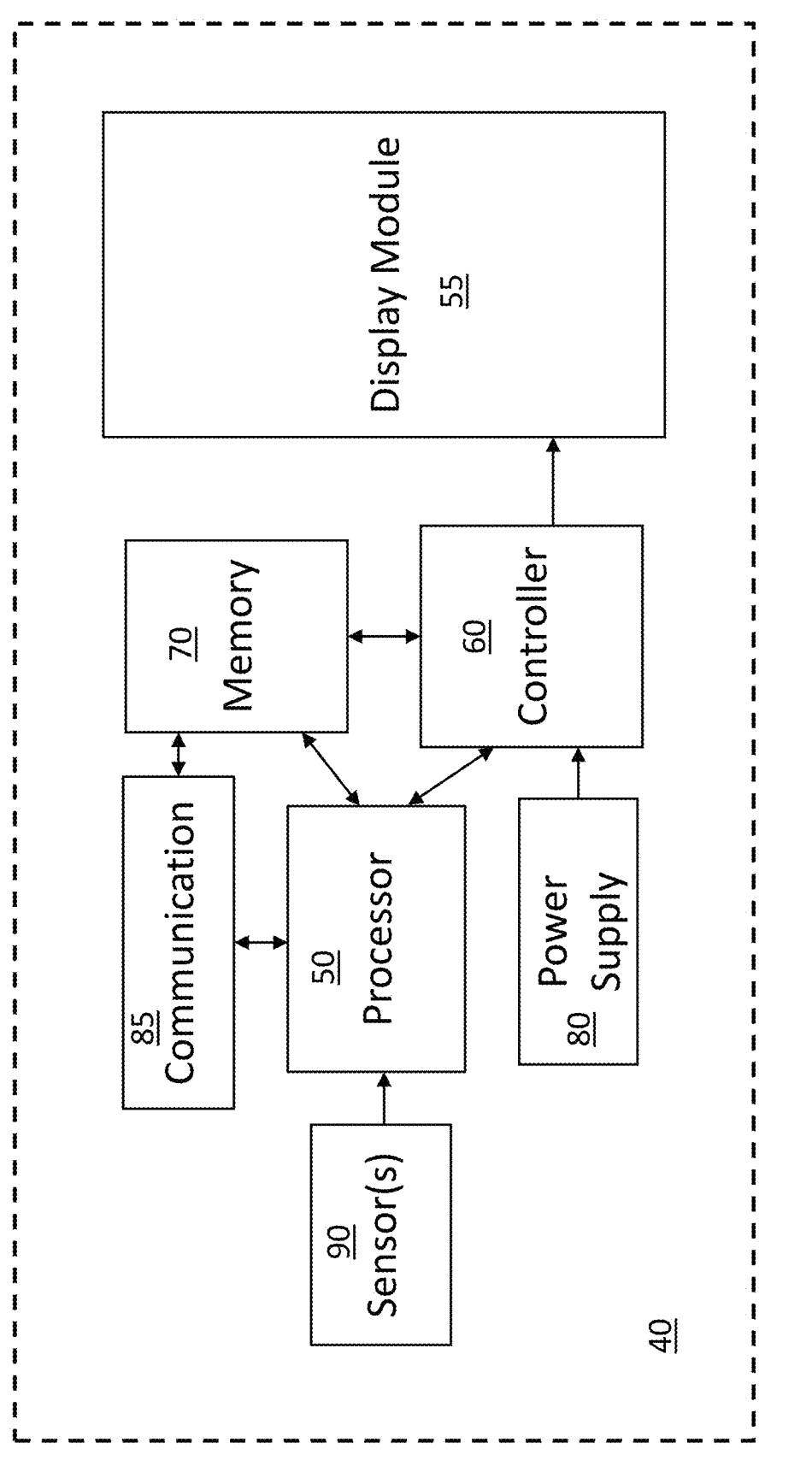
FIG. 3 illustrates an exemplary electrophoretic display that includes a display module. The electrophoretic display also includes a processor, memory, one or more power supplies, and a controller. The electrophoretic display may also include sensors to allow the electrophoretic display to adjust operational parameters based upon the ambient environment, e.g., temperature and illumination.

The active matrix 260 described with respect to FIG. 2B is typically covered by a protective sheet (e.g., integrated barrier) and sealed to create a display module 55, as shown in FIG. 3. Such a display module 55 becomes the focus of an electrophoretic display 40. The electrophoretic display 40 will typically include a processor 50, which is configured to coordinate the many functions relating to displaying content on the display module 55, and to transform "standard" images, such as sRGB images to a color regime that best duplicates the image on the display module 55. Of course, if the electrophoretic display is being used as a sensor or counter, the content may relate to other inputs. The processor 50 is typically a mobile processor chip, such as made by Freescale or Qualcomm, although other manufacturers are known. The processor 50 is in frequent communication with the non-transitory memory 70, from which it pulls image files and/or look up tables to perform the color image transformations described below. The non-transitory memory 70 may also include gate driving instructions to the extent that a particular color transition may require a different gate driving pattern. The electrophoretic display 40 may have more than one non-transitory memory chip. The non-transitory memory 70 may be flash memory. Once the desired image has been converted for display on the display module 55, the specific image instructions are sent to a controller 60, which facilitates voltage sequences being sent to the respective thin film transistors (described above). Such voltages typically originate from one or more power supplies 80, which may include, e.g., a power management integrated chip (PMIC). The electrophoretic display 40 may additionally include communication 85, which may be, for example, WIFI protocols or BLUETOOTH, and allows the electrophoretic display 40 to receive images and instructions, which also may be stored in memory 70. The electrophoretic display 40 may additionally include one or more sensors 90, which may include a temperature sensor and/or a photo sensor, and such information can be fed to the processor 50 to allow the processor to select an optimum look-up-table when such look-up-tables are indexed for ambient temperature or incident illumination intensity or spectrum. In some instances, multiple components of the electrophoretic display 40 can be embedded in a singular integrated circuit. For example, a specialized integrated circuit may fulfill the functions of processor 50 and controller 60.

As shown in FIG. 4A, in the instance of a four-particle system including subtractive cyan, yellow, and magenta particles paired with a reflective white particle, each of the eight principal colors (red, green, blue, cyan magenta, yellow, black and white) corresponds to a different arrangement of the four pigments. The three particles providing the three subtractive primary colors, e.g., for an Advanced Color electronic Paper (ACeP) display, may be substantially non-light-scattering ("SNLS"). The use of SNLS particles allows mixing of colors and provides for more color outcomes than can be achieved with the same number of scattering particles. These thresholds must be sufficiently separated relative to the voltage driving levels for avoidance of cross-talk between particles, and this separation necessitates the use of high addressing voltages for some colors. In addition, addressing the colored particle with the highest threshold also moves all the other colored particles, and these other particles must subsequently be switched to their desired positions at lower voltages.

The system of FIG. 4A, in principle, works similar to printing on bright white paper in that the viewer only sees those colored pigments that are on the viewing side of the white pigment (i.e., the only pigment that scatters light). In FIG. 4A, it is assumed that the viewing surface of the display is at the top (as illustrated), i.e., a user views the display from this direction, and light is incident from this direction. As already noted, in preferred embodiments only one of the four particles used in the electrophoretic medium of the present invention substantially scatters light, and in FIG. 4A this particle is assumed to be the white pigment. This light-scattering white particle forms a white reflector against which any particles above the white particles (as illustrated in FIG. 4A) are viewed. Light entering the viewing surface of the display passes through these particles, is reflected from the white particles, passes back through these particles and emerges from the display. Thus, the particles above the white particles may absorb various colors and the color appearing to the user is that resulting from the combination of particles above the white particles. Any particles disposed below (behind from the user's point of view) the white particles are masked by the white particles and do not affect the color displayed. Because the second, third and fourth particles are substantially non-light-scattering, their order or arrangement relative to each other is unimportant, but for reasons already stated, their order or arrangement with respect to the white (light-scattering) particles is critical.

More specifically, when the cyan, magenta and yellow particles lie below the white particles (Situation [A] in FIG. 4A), there are no particles above the white particles and the pixel simply displays a white color. When a single particle is above the white particles, the color of that single particle is displayed, yellow, magenta and cyan in Situations [B], [D] and [F] respectively in FIG. 4A. When two particles lie above the white particles, the color displayed is a combination of those of these two particles; in FIG. 4A, in Situation [C], magenta and yellow particles display a red color, in Situation [E], cyan and magenta particles display a blue color, and in Situation [G], yellow and cyan particles display a green color. Finally, when all three colored particles lie above the white particles (Situation [H] in FIG. 4A), all the incoming light is absorbed by the three subtractive primary colored particles and the pixel displays a black color.

An alternative particle set using reflective color particles is shown in FIG. 4B. In the embodiment of FIG. 4B, the reflective particles are white, red, and yellow, and they are combined with a semi-transparent blue, however alternative color sets could be used provided that the combination of colors suitably spanned the useful color spectrum. In the system of FIG. 4B, for white, red, and yellow, the color viewed at the surface is due to direct reflection of the colored particles, for orange it is a mixture of red and yellow reflective pigments. For green, blue, and black at the viewing surface, the colors at the viewing surface are due to mixtures of the semi-transparent blue particle with reflective yellow, white, and red particles, respectively. Because a viewer is looking at light that is predominantly only interacting with one pigment surface, images produced with a system of FIG. 4B appear more saturated than the colors of FIG. 4A. However the overall gamut of colors using a system of FIG. 4B is diminished as compared to those of FIG. 4A because it is difficult to achieve fine control of the amount of specific particles that are mixed together to create secondary colors (e.g., orange, green, violet). In applications such as digital signage, the saturation is often more important than the color gamut, and many users are satisfied with a set of seven or eight "standard" colors. It should also be realized with respect to FIG. 4B, that the reflective red and semi-transparent blue particles can switch roles, i.e., to make an electrophoretic display medium including reflective white, yellow, and blue particles and a semi-transparent red particle. Such a system yields a set of primary colors similar to FIG. 4B, but wherein red at the viewing surface results from a combination of semi-transparent red and white.

Different combinations of light scattering and light absorbing particle sets are also possible. For example, one subtractive primary color could be rendered by a particle that scatters light, so that the display would comprise two types of light-scattering particle, one of which would be white and another colored. In this case, however, the position of the light-scattering colored particle with respect to the other colored particles overlying the white particle would be important. For example, in rendering the color black (when all three colored particles lie over the white particles) the scattering colored particle cannot lie over the non-scattering colored particles (otherwise they will be partially or completely hidden behind the scattering particle and the color rendered will be that of the scattering colored particle, not black). Of course, it would not be easy to render the color black if more than one type of colored particle scattered light without the presence of an absorptive black particle.

FIGS. 4A and 4B show idealized situations in which the colors are uncontaminated (i.e., the light-scattering white particles completely mask any particles lying behind the white particles in FIG. 4A, or the selected reflective particles shield all of the other particles that should not be visible in FIG. 4B). In practice, the masking by the white particles may be imperfect so that there may be some small absorption of light by a particle that ideally would be completely masked. Such contamination typically reduces both the lightness and the chroma of the color being rendered. In the instance of FIG. 4B, the presence of the light-absorbing particles often causes the overall image to look darker due to imperfect scattering of the reflective particles. This is particularly problematic for green hues because the human eye is very sensitive to different shades of green, whereas different shades of red are not as noticeable. In some embodiments, this can be corrected with the inclusion of additional particles with different steric or charge characteristics, e.g., a green scattering particle, however adding additional particles complicates the drive scheme and may require a wider range of driving voltages. Obviously, in the electrophoretic media described herein, such color contamination should be minimized to the point that the colors formed are commensurate with an industry standard for color rendition. A particularly favored standard is SNAP (the standard for newspaper advertising production), which specifies L*, a* and b* values for each of the eight primary colors referred to above.

Waveforms for driving four-particle electrophoretic media have been described previously. Waveforms for driving color electrophoretic displays having four particles are described in U.S. Pat. Nos. 9,921,451, 9,812,073, and 11,640,803, all of which are incorporated by reference herein. Most commercial electrophoretic displays use amorphous silicon based thin-film transistors (TFTs) in the construction of active matrix backplanes (260) because of the wider availability of fabrication facilities and the costs of the various starting materials. Amorphous silicon thin-film transistors may become unstable when supplied gate voltages that would allow switching of voltages higher than about +/−15V. Accordingly, as described in previous patents/applications on such systems, improved performance is achieved by additionally changing the bias of the top light-transmissive electrode with respect to the bias on the backplane pixel electrodes, a technique known as top-plane switching. Thus, if a voltage of +30V (relative to the backplane) is needed, the top plane may be switched to −15V while the appropriate backplane pixel is switched to +15V. Methods for driving a four-particle electrophoretic system with top-plane switching are described in greater detail in, for example, U.S. Pat. No. 9,921,451. In alternative embodiments, metal oxide semiconductors may be incorporated into thin film transistors for active matrix backplanes (260), including IGZO, i.e., as described in U.S. Pat. No. 11,776,496, which is incorporated by reference in its entirety.

In prior embodiments of the Advanced Color electronic Paper (ACeP), the waveform (voltage against time curve) applied to the pixel electrode of the backplane of a display of the invention is described and plotted, while the front electrode is assumed to be grounded (i.e., at zero potential). The electric field experienced by the electrophoretic medium is of course determined by the difference in potential between the backplane and the front electrode and the distance separating them. The display is typically viewed through its front electrode, so that it is the particles adjacent the front electrode which control the color displayed by the pixel, and if it is sometimes easier to understand the optical transitions involved if the potential of the front electrode relative to the backplane is considered; this can be done simply by inverting the waveforms discussed below.

Figure 5A:
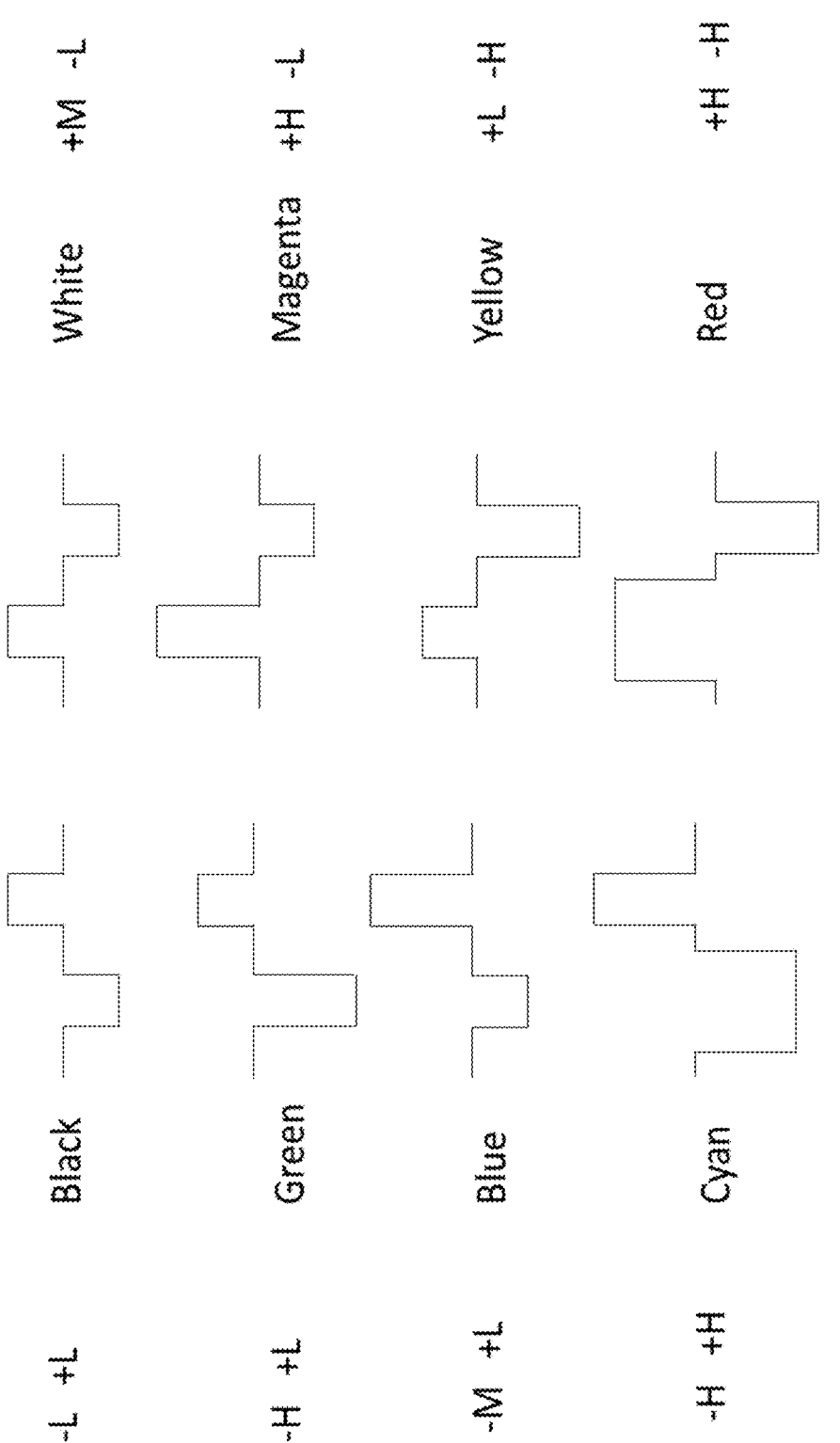
FIG. 5A shows (prior art) push-pull waveforms that can be used to achieve specific colors in an EPD system including one reflective (white) particle, and three subtractive (cyan, yellow, magenta) particles.

FIG. 5A shows typical waveforms (in simplified form) used to drive a four-particle color electrophoretic display system of the type depicted in FIG. 4A. Such waveforms have a simple "push-pull" structure: i.e., they consist of a dipole comprising two pulses of opposite polarity. The magnitudes and lengths of these pulses determine the color obtained. At a minimum, there should be five such voltage levels. FIG. 5A shows high and low positive and negative voltages, as well as zero volts. Typically, "low" (L) refers to a range of about five-15V, while "high" (H) refers to a range of about 15-30V. In general, the higher the magnitude of the "high" voltages, the better the color gamut achieved by the display. The "medium" (M) level is typically around 15V; however, the value for M will depend somewhat on the composition of the particles, as well as the environment of the electrophoretic medium. In some embodiments, the high negative voltage is between −30V and −20V, the medium negative voltage is between −20V and −2V, the medium positive voltage is between 2V and 20V, and the high positive voltage is between 20V and 30V. For example, the high negative voltage is −27V, the medium negative voltage is −15V, the medium positive voltage is 15V, and the high positive voltage is 27V. If only three voltages are available (i.e., +V$_{high}$, 0, and −V$_{high}$) it may be possible to achieve the same result as addressing at a lower voltage (say, V$_{high}$/n where n is a positive integer>1) by addressing with pulses of voltage V$_{high}$ but with a duty cycle of 1/n. Push-pull (PP) waveforms can be achieved with more driving levels. For example, a seven-level driver might provide seven different voltages to the data lines during the update of a selected pixel of the display (e.g., V$_H$, V$_H$', V$_H$", 0, V$_L$", V$_L$', V$_L$; e.g., +V$_H$, +V$_M$, +V$_L$, 0, −V$_L$, −V$_M$, −V$_H$). The spacing between drive levels can be the same, or different, depending upon the formulation of the electrophoretic medium. For example, +V$_H$=27V, +V$_M$=15V, +V$_L$=5V, 0, −V$_L$=−5V, −V$_M$=−15V, −V$_H$=−27V. For example, +V$_H$=30V, +V$_M$=20V, +V$_L$=10V, 0, −V$_L$=−10V, −V$_M$=−20V, −V$_H$=−30V. Regardless, when using a seven-level driver to drive an active matrix backplane having a single controller, the controller can only update a given pixel one frame at a time. Accordingly, any enhanced push pull waveform is composed of some combination of pulses, each lasting a frame period. See, e.g., FIG. 6A. The resulting waveform, used to achieve a desired optical state in the medium, is constructed from some combination of the pulses of FIG. 6A, assuming that such a waveform may have no, or some number, n, of each of the pulses of FIG. 6A.

Figure 5B:
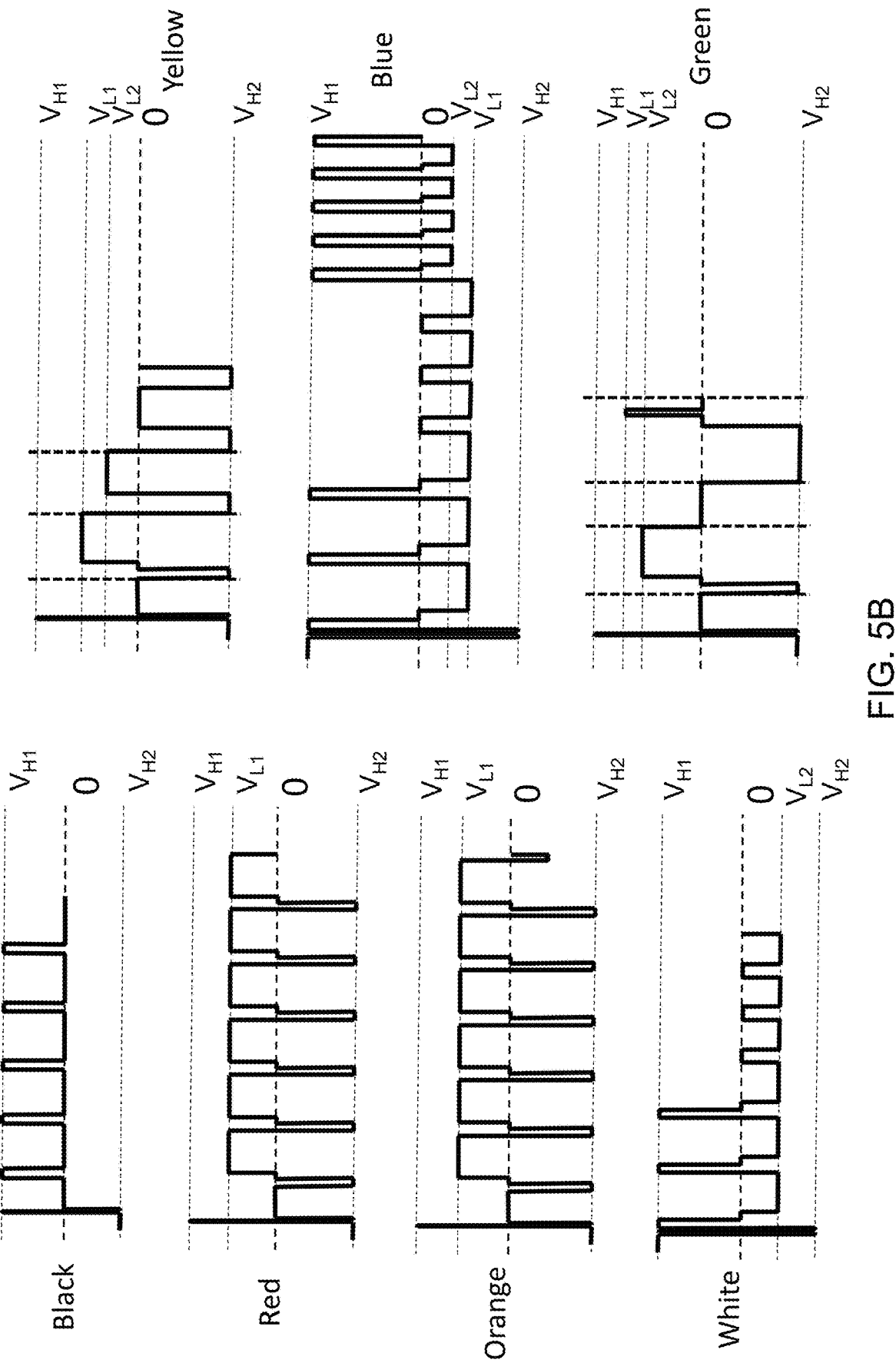
FIG. 5B shows (prior art) push-pull waveforms that can be used to achieve specific colors in an EPD system including reflective white, red, and yellow particles, and a semi-absorptive blue particle.

As a compliment to FIG. 5A, a set of waveforms to achieve the color states of a system depicted in FIG. 4B is shown in FIG. 5B. The set of waveforms is described more fully in U.S. Pat. No. 11,640,803. Although in principle the various colors of a system of FIG. 4B can be produced by push pull waveforms of the type show in FIG. 5A, systems of FIG. 4B have been used for larger format devices, which are typically constructed from amorphous silicon backplanes, which are only capable of delivering +15V to −15V. The intermediate voltage levels between +15V and −15V are typically achieved with the inclusion of one or more power management chips (PMIC), which may also be incorporated into the controller 60, e.g., as shown in FIG. 3. When limited by this voltage range, a more complicated waveform is preferred, as described below with reference to FIG. 5B, which provides better color separation over a longer time. Nonetheless, there is no reason that systems of FIG. 4B cannot be used with more exotic thin-film transistor materials such as metal oxides and mixed metal oxides, such as IGZO.

Figure 6A:
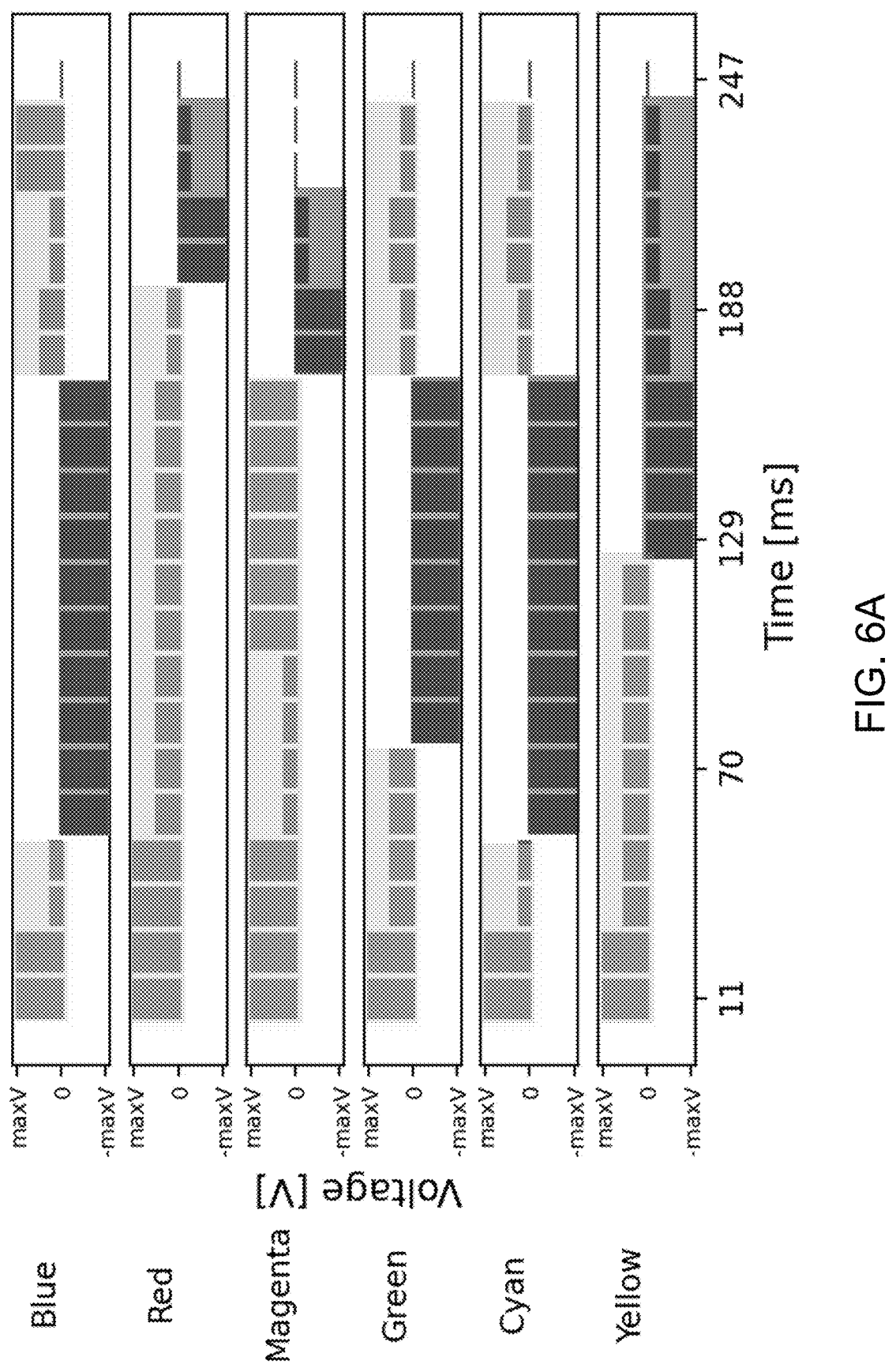
FIG. 6A shows exemplary fast-response waveforms for transitioning a four-particle WCMY electrophoretic media above a display electrode from white to the respective color.

Unfortunately, the push-pull waveforms depicted in FIGS. 5A and 5B are "flashy" meaning that a user visualizes dramatic color swings over a short period of time. The flashes are necessary to separate the different particle sets and to redistribute them in the correct order to achieve the desired colors. See, e.g., FIGS. 4A and 4B. Additionally, to achieve good color saturation, the push-pull waveforms are repeated, e.g., as shown in FIG. 5B, which makes the updates both "flashy" and long. Alternatively, as shown in FIG. 6A, each color state can be reconstructed as a so-called "shaped pulse" transition structure that includes only finite set of positive or negative shaped pulses, and which crosses between positive and negative as few times as necessary. Furthermore, for specialty applications, as described below, the initial frames can be selected to create a user experience where the user perceives for the color change to be nearly instantaneous.

A "shaped pulse" is defined as a series of frames with same sign voltages, excluding 0V frames:

*PositiveShapedPulse =*

$$\{v_0, \ldots, v_n | 0 < v_i \leq maxVoltage, \text{ and } v_i \text{ is an integer}\}$$

$$And:$$

*NegativeShapedPulse =*

$$\{v_0, \ldots, v_n | minVoltage \leq v_i < 0, \text{ and } v_i \text{ is an integer}\}$$

The shaped pulse transitions are optimized to reach a specific optical state by modifying the number of pulses per waveform and exploring different combinations of voltage levels within a pulse. The optimization can be simplified by limiting or setting in advance the number of pulses per transition, restricting the number of voltage levels per pulse and so forth. The resulting structure is still flexible enough to allow the waveform to reach a variety of optical states, and is constrained enough to be supported by look-up-tables that can be indexed by color, display use case (e.g., stylus input), and environmental conditions such as temperature or ambient light levels or spectrum. Typically, the waveforms are achieved with at least a five-level drive scheme, i.e., including V++, V+, 0, V−, and V−−, wherein V++ and V−− are at least 24V in magnitude. Additional voltage levels may be added, e.g., a seven-level drive scheme including V+++, V++, V+, 0, V−, V−−, and V−−−, wherein V+++ and V−−− are at least 24V in magnitude. In some embodiments, the highest magnitude voltage levels may be 27V in magnitude or more, or 30V in magnitude or more.

As shown in FIG. 6A, the transition appearance is managed by the number and length of the shaped pulses. The number of pulses per waveform sets the number of color changes in the transition. Setting the number of shaped pulses to be m pulses, guarantees a maximum m oscillations in brightness throughout the transition because the overall waveform is limited to m drives with consecutive positive and negative pulses. In addition, by forcing the shaped pulses to be longer than a certain length, the color oscillations will be formed slower and over a longer period of time, which result in a smoother and less flashy transition appearance.

The transition's responsiveness can be managed by shifting the waveform to the left and forcing a positive or negative pulse at the beginning of the waveform, depending on the initial optical state. For example, when transitioning from a white optical state, driving with a high voltage pulse will generate a quick response to black or gray, as shown in the waveforms in FIG. 6A. Because these colors have high contrast with the white initial state, the response will appear immediate to an observer. In applications using so called "night mode" i.e., white writing/text on a dark background, the initial frames may use high negative voltage pulses to provide a fast contrast to the dark background, which gradually transitions to the desired color.

Figure 6B:
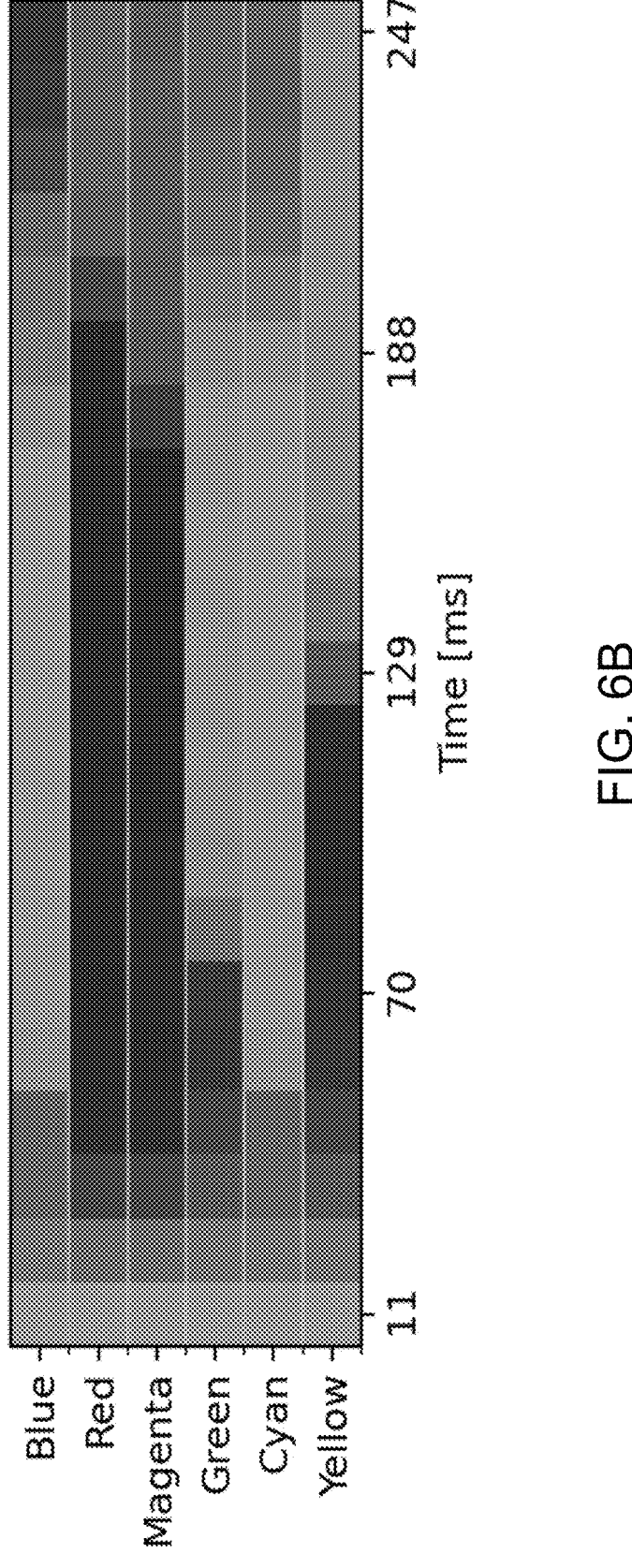
FIG. 6B shows modeled color transitions (as experienced by user) for transitioning a four-particle WCMY electrophoretic media above a display electrode from white to the respective colors show in FIG. 6A.

For an ACEP-type system (i.e., as depicted in FIG. 4A), it is possible to predict transition appearances for the color transitions of FIG. 6A at 25° C., starting from initial white state. As can be seen in FIG. 6B, high responsiveness results from the first 24 ms generating a distinct gray—which has high contrast relative a white background. The transition appearance can be seen to be favorable by noting that from the beginning until the end of the transition there are not many oscillations in brightness. The optical response is either white→black→color or white→black→white→color. Accordingly, the shaped pulse transition structure is a simple, and allows an electrophoretic display device to achieve a desirable optical state on multi-pigment electrophoretic displays while keeping the flashiness and latency to the initial response low. The amount and length of the shaped pulses make the waveform transition slowly between colors. Forcing a positive pulse at the beginning of the waveform, results in an immediate change in contrast when transitioning from white, making it seem responsive.

Figure 7A:
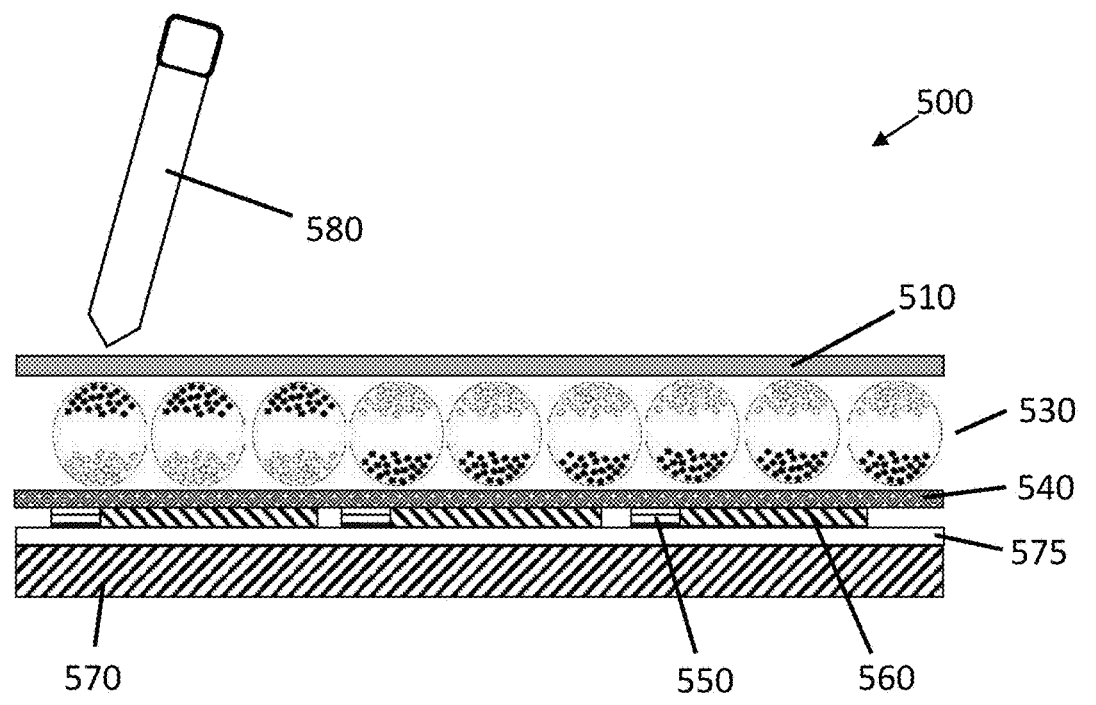
FIG. 7A illustrates an exemplary electrophoretic display, including a layer of electrophoretic medium encapsulated in microcapsules, that is configured to receive input with a stylus.
Figure 7B:
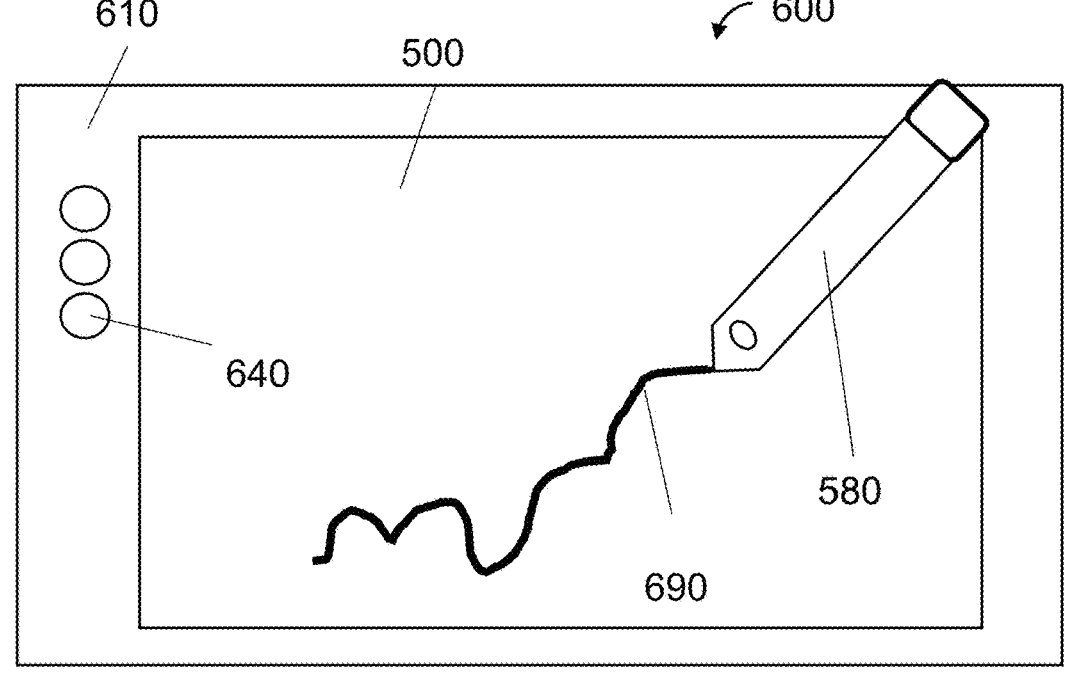
FIG. 7B illustrates an exemplary electrophoretic display, including a layer of electrophoretic medium encapsulated in microcapsules, that is configured to receive input with a stylus.

One application of the waveforms of FIG. 6A is for color electrophoretic displays that are enabled to interact with a stylus 580 or another entry device. For example, as depicted in FIG. 7A, an electrophoretic display module 500 may include an encapsulated four-particle electrophoretic display media 530 of the type that is discussed above. The tablet 500 includes a top light-transmissive electrode layer 510 as well as an active matrix backplane that included thin film transistors 550 and pixel electrodes 560 and disposed on a substrate 570. An adhesive layer 540 is disposed between the encapsulated four-particle electrophoretic display media 530 and the active matrix backplane during assembly of the module. The electrophoretic display module 500 will be incorporated into a chassis 610 to create an electrophoretic display tablet 600, similar to the tablets currently offered by, e.g., Amazon (Kindle Scribe), ReMarkable, and Onyx BOOX (Note Air 3). Such an electrophoretic display tablet 600 may also include physical control buttons 640 or the controls may be integrated into the system. Additionally, such an electrophoretic display tablet 600 may also have BLUETOOTH or other wireless connectivity that allows, e.g., use of a mouse or keyboard with the electrophoretic display tablet 600.

As shown in FIG. 7A, the electrophoretic display module 500 includes a digitizing layer 575 that can track the position of the stylus 580. Because the stylus 580 includes an inductive coil, the motion of the stylus interacts with the electromagnetic fields produced by the digitizing layer 575, allowing the digitizing layer to determine a position in the X-Y plane defined by the digitizing layer 575. The digitizing layer 575 is typically coupled to memory so that the movement of the stylus 580 can be recorded in an electronic file, whereby the electronic file may be printed, converted into a .pdf document, e-mailed, etc. Furthermore, the electronic file may be the basis for a global update to the image, e.g., via the display driver, after some amount of writing has been completed. As a user "writes" with the stylus 580 on the electrophoretic display tablet 600, the user expects the resultant graphic 690 to appear nearly instantaneously, and with good color depth. For example, if the user has chosen to underline in red on a black text on white .pdf document, the user expects the instantaneous presence of a red line as the stylus 580 is dragged across the display screen. Using the waveforms of FIG. 6A, a user will see an instantaneous change (i.e., in less than 50 ms, less than 30 ms, optimally less than 20 ms), especially from the white state, where the stylus 580 has been placed. Furthermore, the waveforms of FIG. 6A allow a given pixel to fill in with the correct color in under 250 ms, typically under 200 ms, with very little flash. Most users do not actually notice that the initial change in color is not a true color, only that it is dark against the white background and in the correct position with respect to the stylus 580 tip. Additionally, in an electrophoretic display tablet 600 using an ACEP system of the type depicted in FIG. 4A, drawing a black line on white or presenting black text on white only requires a 5-10 frames of max V, i.e., similar to the initial frames of the red waveform of FIG. 6A. The black waveform may be further modified as a push pull to achieve DC-balanced driving, or a series of maxV frames may be counteracted with active remnant voltage management at a later time,

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The invention claimed is:

1. A method of causing a color state transition in a four-particle electrophoretic display comprising one negative particle set and three different positive particle sets, wherein each particle set is a different color and one of the particle sets is white in color, and wherein the display is configured to provide at least five voltages to pixel electrodes of the display, V++, V+, 0, V−, and V−−, the method comprising:

providing a first sequence including at least three sequential frames of a same polarity (+ or −), wherein a first frame of the first sequence is at a respective highest voltage (V++, V−−);

providing a second sequence including at least three sequential frames of an opposite polarity (− or +); and providing a third sequence including at least one frame of the same polarity (+ or −) or zero volts.

2. The method of claim 1, wherein the first sequence includes frames at V++ and V+, or at V−− and V−.

3. The method of claim 1, wherein the second sequence includes frames at V−− and V−, or at V++ and V+.

4. The method of claim 1, wherein the display is further configured to provide an additional positive voltage between V++ and 0 and an additional negative voltage between V−− and 0, and the first sequence includes frames at the additional positive voltage between V++ and 0 or at the additional negative voltage between V−− and 0.

5. The method of claim 4, wherein the voltages are V++=24V, V+=6V, 0V, V−=−6V, and V−−=−24V, and the additional positive voltage between V++ and 0 is +12V, and the additional negative voltage between V−− and 0 is −12V.

6. The method of claim 1, wherein the display is further configured to provide an additional positive voltage between V++ and 0 and an additional negative voltage between V−− and 0, and the second sequence includes frames at the additional negative voltage between V−− and 0 or at the additional positive voltage between V++ and 0.

7. The method of claim 6, wherein the voltages are V++=24V, V+=6V, 0V, V−=−6V, and V−−=−24V, and the additional positive voltage between V++ and 0 is +12V, and the additional negative voltage between V−− and 0 is −12V.

8. The method of claim 1, wherein an elapsed time for transition from a white state to a final color at the viewing surface is less than 300 ms or less than 250 ms.

9. The method of claim 1, wherein each frame is less than 20 ms in time.

10. A method of causing a color state transition in a four-particle electrophoretic display comprising one positive particle set and three different negative particle sets, wherein each particle set is a different color and one of the particle sets is white in color, and wherein the display is configured to provide at least five voltages to pixel electrodes of the display, V++, V+, 0, V−, and V−−, the method comprising:

providing a first sequence including at least three sequential frames of a same polarity (+ or −), wherein a first frame of the first sequence is at a respective highest voltage (V++, V−−);

providing a second sequence including at least three sequential frames of an opposite polarity (− or +); and providing a third sequence including at least one frame of the same polarity (+ or −) or zero volts.

11. The method of claim 10, wherein the first sequence includes frames at V++ and V+, or at V−− and V−.

12. The method of claim 10, wherein the second sequence includes frames at V−− and V−, or at V++ and V+.

13. The method of claim 10, wherein the display is further configured to provide an additional positive voltage between V++ and 0 and an additional negative voltage between V−− and 0, and the first sequence includes frames at the additional positive voltage between V++ and 0 or at the additional negative voltage between V−− and 0.

14. The method of claim 13, wherein the voltages are V++=24V, V+=6V, 0V, V−=−6V, and V−−=−24V, and the additional positive voltage between V++ and 0 is +12V, and the additional negative voltage between V−− and 0 is −12V.

15. The method of claim 10, wherein the display is further configured to provide an additional positive voltage between V++ and 0 and an additional negative voltage between V−− and 0, and the second sequence includes frames at the additional negative voltage between V−− and 0 or at the additional positive voltage between V++ and 0.

16. The method of claim 15, wherein the voltages are V++=24V, V+=6V, 0V, V−=−6V, and V−−=−24V, and the additional positive voltage between V++ and 0 is +12V, and the additional negative voltage between V−− and 0 is −12V.

17. The method of claim 10, wherein an elapsed time for transition from a white state to a final color at the viewing surface is less than 300 ms or less than 250 ms.

18. The method of claim 10, wherein each frame is less than 20 ms in time.

19. A method of causing a color state transition in a four-particle electrophoretic display comprising two negative particle sets and two different positive particle sets, wherein each particle set is a different color and one of the particle sets is white in color, and wherein the display is configured to provide at least five voltages to pixel electrodes of the display, V++, V+, 0, V−, and V−−, the method comprising:

providing a first sequence including at least three sequential frames of a same polarity (+ or −), wherein a first frame of the first sequence is at a respective highest voltage (V++, V−−);

providing a second sequence including at least three sequential frames of an opposite polarity (− or +); and providing a third sequence including at least one frame of the same polarity (+ or −) or zero volts.

* * * * *